(12) United States Patent
Bruckner et al.

(10) Patent No.: US 11,166,475 B2
(45) Date of Patent: Nov. 9, 2021

(54) AUTOMATIC FROZEN FOOD PRODUCT VENDING MACHINE

(71) Applicant: THE VOLLRATH COMPANY, L.L.C., Sheboygan, WI (US)

(72) Inventors: Gary E. Bruckner, Kiel, WI (US); Richard Koehl, Sheboygan Falls, WI (US); Tony J. Kopidlansky, Manitowoc, WI (US); Aamer Mohammed, Manitowoc, WI (US); Douglas J. Shymanski, New Holstein, WI (US); Dave Wattenford, Sheboygan, WI (US)

(73) Assignee: THE VOLLRATH COMPANY, L.L.C., Sheboygan, WI (US)

( * ) Notice: Subject to any disclaimer, the term of this patent is extended or adjusted under 35 U.S.C. 154(b) by 74 days.

(21) Appl. No.: 16/260,023

(22) Filed: Jan. 28, 2019

(65) Prior Publication Data
US 2019/0150470 A1 May 23, 2019

Related U.S. Application Data

(60) Continuation of application No. 15/425,225, filed on Feb. 6, 2017, now Pat. No. 10,188,128, which is a
(Continued)

(51) Int. Cl.
*A23G 9/28* (2006.01)
*G07F 9/10* (2006.01)
(Continued)

(52) U.S. Cl.
CPC .............. *A23G 9/283* (2013.01); *A23G 9/28* (2013.01); *G07F 9/105* (2013.01); *G07F 11/16* (2013.01);
(Continued)

(58) Field of Classification Search
CPC .......... A23G 9/283; A23G 9/28; A23G 9/288; G07F 13/10; G07F 13/06; G07F 13/04; G07F 13/00; G07F 9/105; G07F 17/0071
See application file for complete search history.

(56) References Cited

U.S. PATENT DOCUMENTS

D111,772 S 10/1938 Kettleborough
2,663,482 A 12/1953 Gilberty
(Continued)

FOREIGN PATENT DOCUMENTS

CN 1141128 A 1/1997
CN 1283163 A 2/2001
(Continued)

OTHER PUBLICATIONS

Extended Search Report for European Application No. 14774864.4, dated Aug. 14, 2017, 13 pages.
(Continued)

*Primary Examiner* — Nicolas A Arnett
(74) *Attorney, Agent, or Firm* — Foley & Lardner LLP

(57) ABSTRACT

An automatic frozen food product vending machine includes a freezer barrel configured to produce a frozen food product, a spigot fluidly connected to the freezer barrel, the spigot for dispensing the frozen food product, a movable platform for supporting a container to receive frozen food product, the movable container movable among a home position and a fill position below the spigot, and a processing circuit configured to open the spigot and fill the container with an amount of frozen food product.

13 Claims, 30 Drawing Sheets

Related U.S. Application Data division of application No. 14/689,746, filed on Apr. 17, 2015, now Pat. No. 9,635,874, which is a continuation-in-part of application No. 13/830,974, filed on Mar. 14, 2013, now Pat. No. 9,259,016.

(51) Int. Cl.
   *G07F 13/10* (2006.01)
   *G07F 11/16* (2006.01)
   *G07F 13/00* (2006.01)
   *G07F 13/06* (2006.01)
   *G07F 17/00* (2006.01)

(52) U.S. Cl.
   CPC .............. *G07F 13/00* (2013.01); *G07F 13/06* (2013.01); *G07F 13/10* (2013.01); *G07F 17/0071* (2013.01)

(56) References Cited

U.S. PATENT DOCUMENTS

| | | | |
|---|---|---|---|
| 3,124,916 | A * | 3/1964 | Anderson et al. ........ B65B 1/24 53/471 |
| 3,276,633 | A | 10/1966 | Rahauser |
| 3,318,428 | A | 5/1967 | Klein |
| 3,554,364 | A | 1/1971 | Lane et al. |
| 3,638,392 | A | 2/1972 | Welker et al. |
| 3,863,724 | A | 2/1975 | Dalia, Jr. |
| 4,009,740 | A | 3/1977 | Michielli |
| 4,098,384 | A | 7/1978 | Kovar |
| 4,174,742 | A | 11/1979 | Murphey |
| 4,186,768 | A | 2/1980 | Kuester |
| 4,188,768 | A | 2/1980 | Getman |
| 4,226,269 | A | 10/1980 | Carr et al. |
| 4,232,798 | A | 11/1980 | Hammel et al. |
| 4,378,164 | A | 3/1983 | Manfroni |
| 4,388,795 | A * | 6/1983 | Stohlquist ............... B65B 43/59 141/150 |
| 4,417,610 | A | 11/1983 | Waldstrom et al. |
| 4,446,896 | A | 5/1984 | Campagna |
| 4,469,150 | A | 9/1984 | Grimaldi |
| 4,518,021 | A * | 5/1985 | Copas ..................... B65B 43/58 141/172 |
| 4,645,093 | A | 2/1987 | Jones |
| 4,953,751 | A | 9/1990 | Shannon |
| 5,009,330 | A | 4/1991 | Young et al. |
| 5,025,840 | A | 6/1991 | Tacke |
| 5,027,698 | A | 7/1991 | Chirnomas |
| 5,105,978 | A | 4/1992 | Trouteaud et al. |
| 5,148,905 | A | 9/1992 | Tacke et al. |
| 5,350,082 | A | 9/1994 | Kiriakides et al. |
| 5,353,904 | A | 10/1994 | Tacke et al. |
| 5,382,090 | A | 1/1995 | Cocchi |
| 5,400,614 | A | 3/1995 | Feola |
| 5,404,797 | A | 4/1995 | Millar |
| 5,450,980 | A | 9/1995 | Laidlaw |
| 5,491,333 | A | 2/1996 | Skell et al. |
| 5,516,002 | A | 5/1996 | Morillo |
| 5,575,066 | A | 11/1996 | Cocchi |
| 5,603,229 | A | 2/1997 | Cocchi et al. |
| 5,615,952 | A | 4/1997 | Cocchi |
| 5,653,118 | A | 8/1997 | Cocchi et al. |
| 5,671,662 | A | 9/1997 | Cocchi et al. |
| 5,727,609 | A | 3/1998 | Knight et al. |
| 5,823,392 | A | 10/1998 | Madico |
| 5,957,040 | A | 9/1999 | Feola |
| 6,082,419 | A | 7/2000 | Skell et al. |
| 6,102,246 | A | 8/2000 | Goulet et al. |
| 6,112,539 | A | 9/2000 | Colberg |
| 6,238,180 | B1 | 5/2001 | Magoshi et al. |
| 6,253,955 | B1 | 7/2001 | Bower |
| 6,264,066 | B1 | 7/2001 | Vincent et al. |
| 6,304,796 | B1 | 10/2001 | Ding |
| 6,305,573 | B1 | 10/2001 | Fritze et al. |
| 6,325,250 | B1 | 12/2001 | Feola |
| 6,389,962 | B1 | 5/2002 | Han et al. |
| 6,390,334 | B1 | 5/2002 | Kim et al. |
| 6,424,884 | B1 | 7/2002 | Brooke et al. |
| 6,485,768 | B2 | 11/2002 | Feola |
| 6,598,758 | B2 | 7/2003 | Kim et al. |
| 6,698,228 | B2 | 3/2004 | Kateman et al. |
| 6,723,361 | B2 | 4/2004 | Feola |
| 6,745,593 | B2 | 6/2004 | Cocchi et al. |
| 6,907,743 | B2 | 6/2005 | Cocchi et al. |
| 7,013,932 | B2 | 3/2006 | Berghoff et al. |
| 7,036,724 | B2 | 5/2006 | Lealao et al. |
| 7,204,360 | B2 | 4/2007 | Rasmussen |
| 7,264,156 | B2 | 9/2007 | Lealao et al. |
| 7,299,109 | B2 | 11/2007 | Juds et al. |
| 7,428,824 | B1 | 9/2008 | Malachowsky et al. |
| 7,448,516 | B2 | 11/2008 | Davis et al. |
| 7,476,353 | B2 | 1/2009 | Cocchi et al. |
| 7,750,817 | B2 | 7/2010 | Teller |
| 7,756,604 | B1 | 7/2010 | Davis et al. |
| 7,762,181 | B2 | 7/2010 | Boland et al. |
| 7,815,954 | B2 | 10/2010 | Miller et al. |
| 7,845,375 | B2 | 12/2010 | Dorney |
| 7,885,520 | B2 | 2/2011 | Stettes |
| 7,896,038 | B2 | 3/2011 | Jones et al. |
| 7,899,713 | B2 | 3/2011 | Rothschild |
| 8,091,374 | B2 | 1/2012 | Chang |
| 8,245,735 | B2 | 8/2012 | Chase et al. |
| 8,297,182 | B2 | 10/2012 | Cocchi et al. |
| 8,335,587 | B2 | 12/2012 | Feola |
| 8,404,166 | B2 | 3/2013 | Cocchi et al. |
| 8,479,532 | B2 | 7/2013 | Cocchi et al. |
| 8,496,141 | B2 | 7/2013 | McKay et al. |
| 8,579,155 | B2 | 11/2013 | Malachowsky et al. |
| 8,591,097 | B2 | 11/2013 | Cocchi et al. |
| 8,739,565 | B2 | 6/2014 | Cocchi et al. |
| 8,746,295 | B2 | 6/2014 | Mueller et al. |
| 8,869,540 | B2 | 10/2014 | Cocchi et al. |
| 8,944,289 | B2 | 2/2015 | Cocchi et al. |
| 8,948,912 | B2 | 2/2015 | Nakamoto et al. |
| 8,978,931 | B2 | 3/2015 | Cocchi et al. |
| 8,989,893 | B2 | 3/2015 | Jones et al. |
| 9,259,016 | B2 | 2/2016 | Mohammed et al. |
| 9,635,874 | B2 | 5/2017 | Bruckner et al. |
| 9,764,880 | B2 | 9/2017 | Hundley et al. |
| 10,188,128 | B2 | 1/2019 | Bruckner et al. |
| 10,448,656 | B2 | 10/2019 | Wetenkamp |
| 2002/0036027 | A1 * | 3/2002 | Kondo .................. B65B 59/003 141/260 |
| 2002/0040915 | A1 | 4/2002 | Kim et al. |
| 2002/0077724 | A1 | 6/2002 | Paulucci et al. |
| 2002/0113078 | A1 | 8/2002 | Kim et al. |
| 2004/0178213 | A1 | 9/2004 | Martinelli et al. |
| 2004/0251270 | A1 | 12/2004 | Davis et al. |
| 2005/0263536 | A1 | 12/2005 | Selfridge et al. |
| 2007/0062981 | A1 | 3/2007 | Cocchi et al. |
| 2007/0199614 | A1 | 8/2007 | Cocchi et al. |
| 2007/0210105 | A1 | 9/2007 | Malachowsky et al. |
| 2007/0254084 | A1 | 11/2007 | Cocchi et al. |
| 2007/0267087 | A1 | 11/2007 | Jones et al. |
| 2008/0073376 | A1 * | 3/2008 | Gist ......................... A23G 9/28 222/145.5 |
| 2008/0093383 | A1 | 4/2008 | Harra |
| 2008/0153567 | A1 | 6/2008 | Juds et al. |
| 2009/0007984 | A1 | 1/2009 | Nuriely |
| 2009/0139257 | A1 | 6/2009 | Cocchi et al. |
| 2009/0157505 | A1 | 6/2009 | Yokoyama |
| 2009/0238931 | A1 | 9/2009 | Herrick et al. |
| 2009/0293733 | A1 | 12/2009 | Martin et al. |
| 2010/0062128 | A1 | 3/2010 | Khoo et al. |
| 2010/0101235 | A1 | 4/2010 | Cocchi et al. |
| 2010/0102078 | A1 | 4/2010 | Mosey |
| 2010/0122539 | A1 | 5/2010 | Cocchi et al. |
| 2010/0125362 | A1 | 5/2010 | Canora et al. |
| 2011/0006079 | A1 | 1/2011 | McKay et al. |
| 2011/0011887 | A1 | 1/2011 | Zaniboni et al. |
| 2011/0101039 | A1 | 5/2011 | Cocchi et al. |
| 2011/0108569 | A1 | 5/2011 | Jones et al. |
| 2011/0256617 | A1 | 10/2011 | Cocchi et al. |
| 2011/0271690 | A1 | 11/2011 | Cocchi et al. |

(56) References Cited

U.S. PATENT DOCUMENTS

| | | |
|---|---|---|
| 2012/0017606 A1 | 1/2012 | Cocchi et al. |
| 2012/0103201 A1 | 5/2012 | Cocchi et al. |
| 2012/0227420 A1 | 9/2012 | Soderman |
| 2012/0251697 A1 | 10/2012 | Cocchi et al. |
| 2013/0000338 A1 | 1/2013 | Cocchi et al. |
| 2013/0014650 A1 | 1/2013 | Cocchi et al. |
| 2013/0103198 A1 | 4/2013 | Nakamoto et al. |
| 2013/0269381 A1 | 10/2013 | Cocchi et al. |
| 2013/0269540 A1 | 10/2013 | Cocchi et al. |
| 2014/0120235 A1 | 5/2014 | Jones et al. |
| 2014/0212559 A1 | 7/2014 | Cocchi et al. |
| 2014/0261873 A1 | 9/2014 | Mohammed et al. |
| 2014/0295044 A1 | 10/2014 | Cocchi et al. |
| 2014/0335250 A1 | 11/2014 | Cocchi et al. |
| 2014/0348999 A1 | 11/2014 | Cocchi et al. |
| 2014/0356494 A1 | 12/2014 | Cocchi et al. |
| 2015/0044331 A1 | 2/2015 | Cocchi et al. |
| 2015/0060488 A1 | 3/2015 | Rupp |
| 2015/0216201 A1 | 8/2015 | Bruckner et al. |
| 2016/0044936 A1 | 2/2016 | Tollefson et al. |
| 2017/0143000 A1* | 5/2017 | Bruckner ............... G07F 9/105 |
| 2017/0225853 A1 | 8/2017 | Hundley et al. |
| 2017/0334617 A1 | 11/2017 | Hundley et al. |
| 2019/0272699 A1* | 9/2019 | Mohammed ............ G07F 9/002 |

FOREIGN PATENT DOCUMENTS

| | | |
|---|---|---|
| EP | 0 596 722 | 5/1994 |
| EP | 1 450 318 | 8/2004 |
| EP | 1 829 453 | 6/2011 |
| EP | 2 197 291 | 11/2011 |
| JP | 2009-278983 A | 12/2009 |
| KR | 20-0203220 | 11/2000 |
| KR | 20-0231268 | 7/2001 |
| KR | 20030060379 | 7/2003 |
| WO | WO-2007/090165 A2 | 8/2007 |
| WO | PCT-2012/007773 | 1/2012 |
| WO | WO-2012/007773 | 1/2012 |
| WO | WO-2016/168273 A1 | 10/2016 |

OTHER PUBLICATIONS

International Search Report and Written Opinion for PCT Application PCT/US2014/017044, dated May 27, 2014, 11 pages.
International Search Report and Written Opinion, PCT/US2016/027251, PW Stoelting, L.L.C., 13 pages (dated Jun. 30, 2016).
International Search Report and Written Opinion, PCT/US2016/027251, PW Stoelting, L.L.C., dated Jun. 30, 2016, 13 pages.
Partial Supplementary Search Report for European Application No. 14774864.4, dated Apr. 19, 2017, 5 pages.
International Search Report and Written Opinion in International Application No. PCT/US2019/020591, dated May 24, 2019. (13 pages).
Carpigiani—Applicare Targa Caratteristiche Instructions Handbook, 191 P/SP Magica USA, 191 P/SP Magica Colore PP USA, distributed Sep. 1, 2011, 50 pages.

* cited by examiner

AUTOMATIC FROZEN FOOD PRODUCT VENDING MACHINE

CROSS-REFERENCE TO RELATED PATENT APPLICATIONS

This is a continuation of U.S. application Ser. No. 15/425,225, filed Feb. 6, 2017, which is a division of U.S. application Ser. No. 14/689,746, filed Apr. 17, 2015, which is a continuation-in-part of U.S. application Ser. No. 13/830,974, filed Mar. 14, 2013, all of which are incorporated herein by reference in their entireties.

BACKGROUND

The present invention relates generally to the field of automatic vending machines and, in particular, to the control and automation of frozen food product vending machines.

Frozen food product dispensing machines are used to dispense soft confectionary products such as aerated ice cream, custard, frozen yogurt, sherbets, sorbets, or other similar frozen food products. Most of these dispensing machines are designed similarly and operate in a similar manner. A storage hopper, reservoir, or bag holds a liquid form of the desired dessert product. Air and the liquid are drawn into a freezing chamber where they are mixed and cooled to form the aerated frozen product that is commonly referred to as a "soft-serve" frozen food product.

SUMMARY

One embodiment of the invention relates to an automatic frozen food product vending machine including a frozen food product dispensing station for dispensing at least one frozen food product, a container dispenser for storing multiple frozen food product containers and configured to automatically dispense one frozen food product container at a time, a first movable platform for supporting a dispensed frozen food product container, a topping dispensing station for dispensing at least one topping, a second movable platform for supporting the dispensed frozen food product container, a user input device configured to receive a user selection of a desired frozen food product, a user selection of a desired amount of frozen food product, and a user selection of a desired topping, and processing electronics. The processing electronics is configured to receive the user selection of the desired frozen food product, the user selection of the desired amount of frozen food product, and the user selection of the desired topping, move the first movable platform below the container dispenser, cause the container dispenser to dispense one frozen food product container onto the first movable platform, move the first movable platform and the dispensed frozen food product container below the frozen food product dispensing station, cause the frozen food product dispensing station to dispense into the frozen food product container a predetermined amount of the selected frozen food product as determined by the user selection of the desired frozen food product and the user selection of the desired amount of frozen food product, transfer the dispensed frozen food product container from the first movable platform to the second movable platform, move the second movable platform and the dispensed frozen product container below the topping dispensing station, and cause the topping dispensing station to dispense into the frozen food product container a predetermined amount of topping as determined by the user selection of the desired topping.

Another embodiment of the invention relates to an automatic frozen food product vending machine including a freezer barrel configured to produce a frozen food product, a spigot fluidly connected to the freezer barrel, the spigot for dispensing the frozen food product, a movable platform for supporting a container to receive frozen food product, the movable container movable among a home position and a fill position below the spigot, and a processing circuit configured to open the spigot and fill the container with an amount of frozen food product.

Another embodiment of the invention relates to an automatic frozen food product vending machine including a first freezer barrel configured to produce a first frozen food product, a first spigot fluidly connected to the first freezer barrel, the first spigot for dispensing the first frozen food product, a second freezer barrel configured to produce a second frozen food product, a second spigot fluidly connected to the second freezer barrel, the second spigot for dispensing the second frozen food product, a third spigot fluidly connected to both the first freezer barrel and the second freezer barrel, the third spigot for dispensing a mixture of the first frozen food product and the second frozen food product, a container dispenser for storing multiple frozen food product containers and configured to automatically dispense one frozen food product container at a time, a first movable platform for supporting a dispensed frozen food product container, the first movable platform movable among a container dispense position below the container dispenser, a first fill position below the first spigot, a second fill position below the second spigot, a third fill position below the third spigot, and a first transfer position, a first topping dispenser for dispensing a first topping, a second topping dispenser for dispensing a second topping, a second movable platform for supporting the dispensed frozen food product container, the second movable platform movable among a second transfer position, a first topping position below the first topping dispenser, and a second topping position below the second topping dispenser, a user input device configured to receive a user selection of a desired frozen food product and a user selection of a desired topping, and processing electronics. The processing electronics is configured to receive the user selection of the desired frozen food product and the user selection of the desired topping, determine a selected fill position from the first fill position, the second fill position, and the third fill position in response to the user selection of the desired frozen food product, determine a selected topping position from the first topping position and the second topping position in response to the user selection of the desired topping, move the first movable platform to the container dispense position, cause the container dispenser to dispenses one frozen food product container when the first movable platform is in the container dispense position, move the first movable platform moves to the selected fill position, cause the spigot associated with the selected fill position to dispenses a predetermined amount of the frozen food product into the dispensed frozen food product container when the first movable platform is in the selected fill position, move the second movable platform to the second transfer position and move the first movable platform to the first transfer position, thereby transferring the dispensed frozen food product container from the first movable platform to the second movable platform, move the second movable platform to the selected topping position, and cause the topping dispenser associated with the selected topping position to dispense a predetermined amount of the topping into the dispensed frozen food product container when the second movable platform is in the selected topping position.

Another embodiment of the invention relates to a method of operating an automatic frozen food product vending machine including receiving with a user input device a user selection of a desired product, receiving with a payment device a payment for the desired product, determining with processing electronics a container as called for by the desired product, a frozen food product as called for by the desired product, and a topping as called for by the desired product, dispensing the container from a container dispenser, dispensing the frozen food product from a frozen food product dispensing station into the container, dispensing the topping from a topping dispensing station a topping into the container, and presenting the desired product resulting from the container, the frozen food product, and the topping to a user.

Alternative exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, in which.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Figure 1:
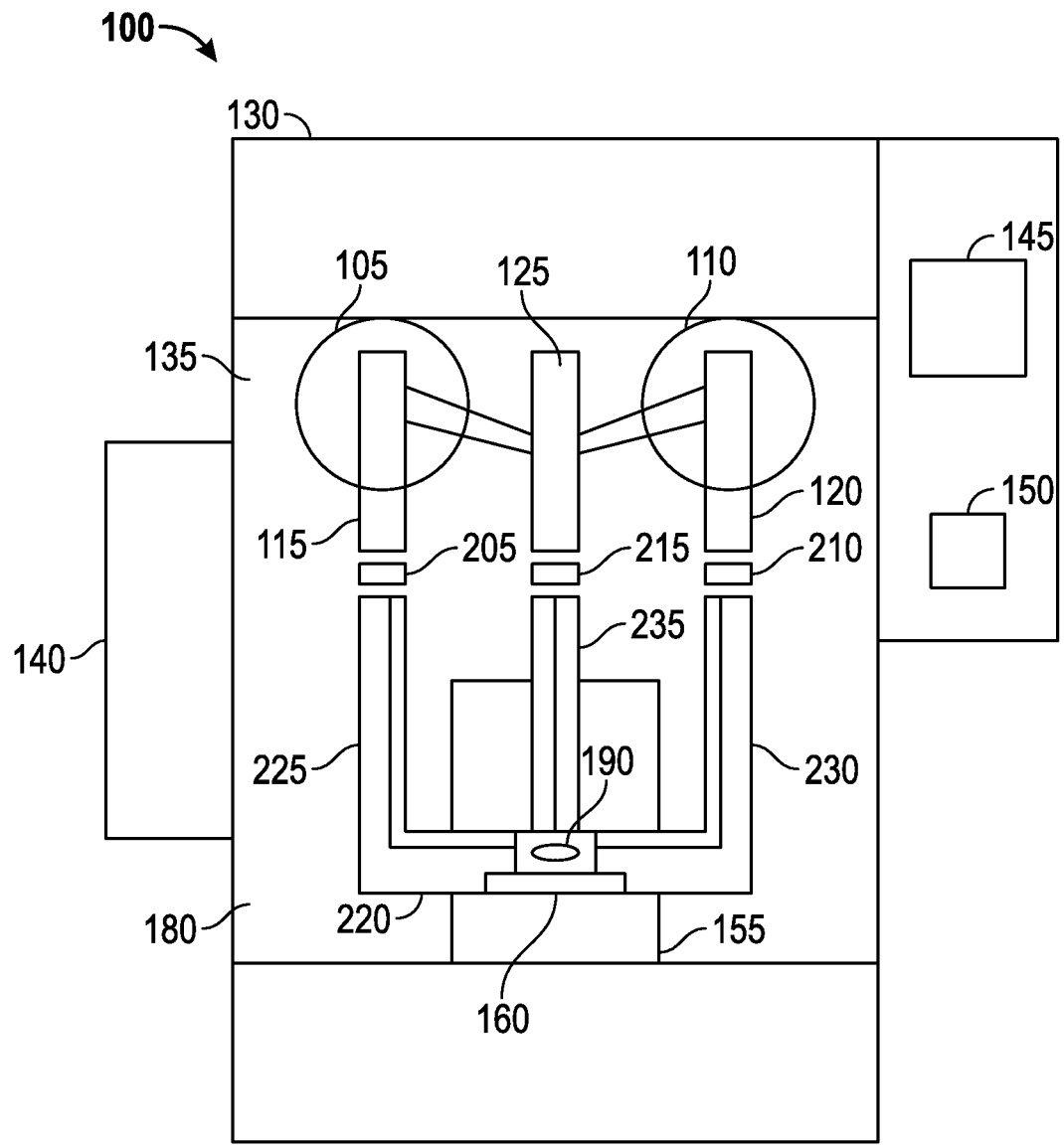
FIG. 1 is a front view of an automatic frozen food product vending machine according to an exemplary embodiment.
Figure 2:
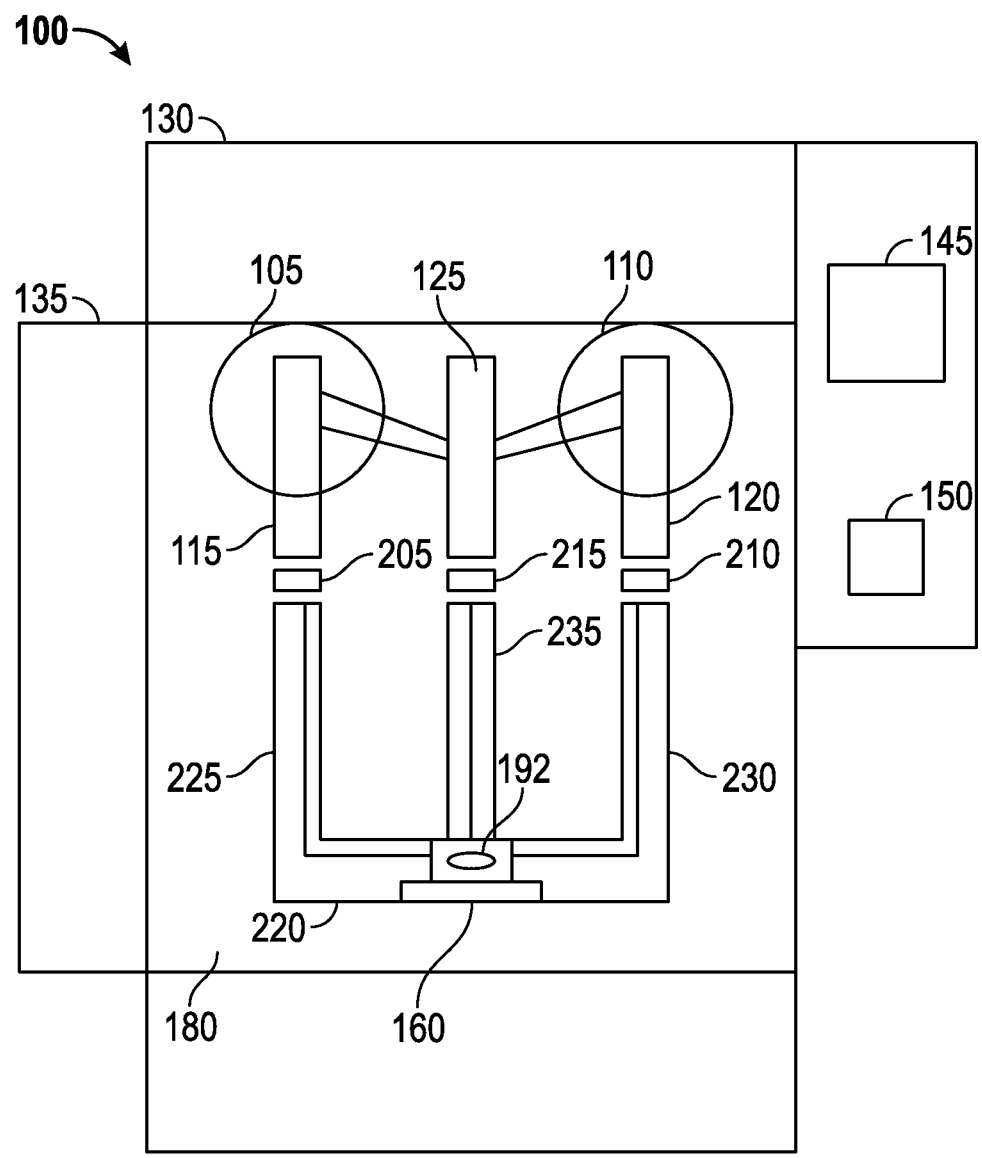
FIG. 2 is a front view of the vending machine of FIG. 1 with a front door open and a movable platform in a first position.
Figure 3:
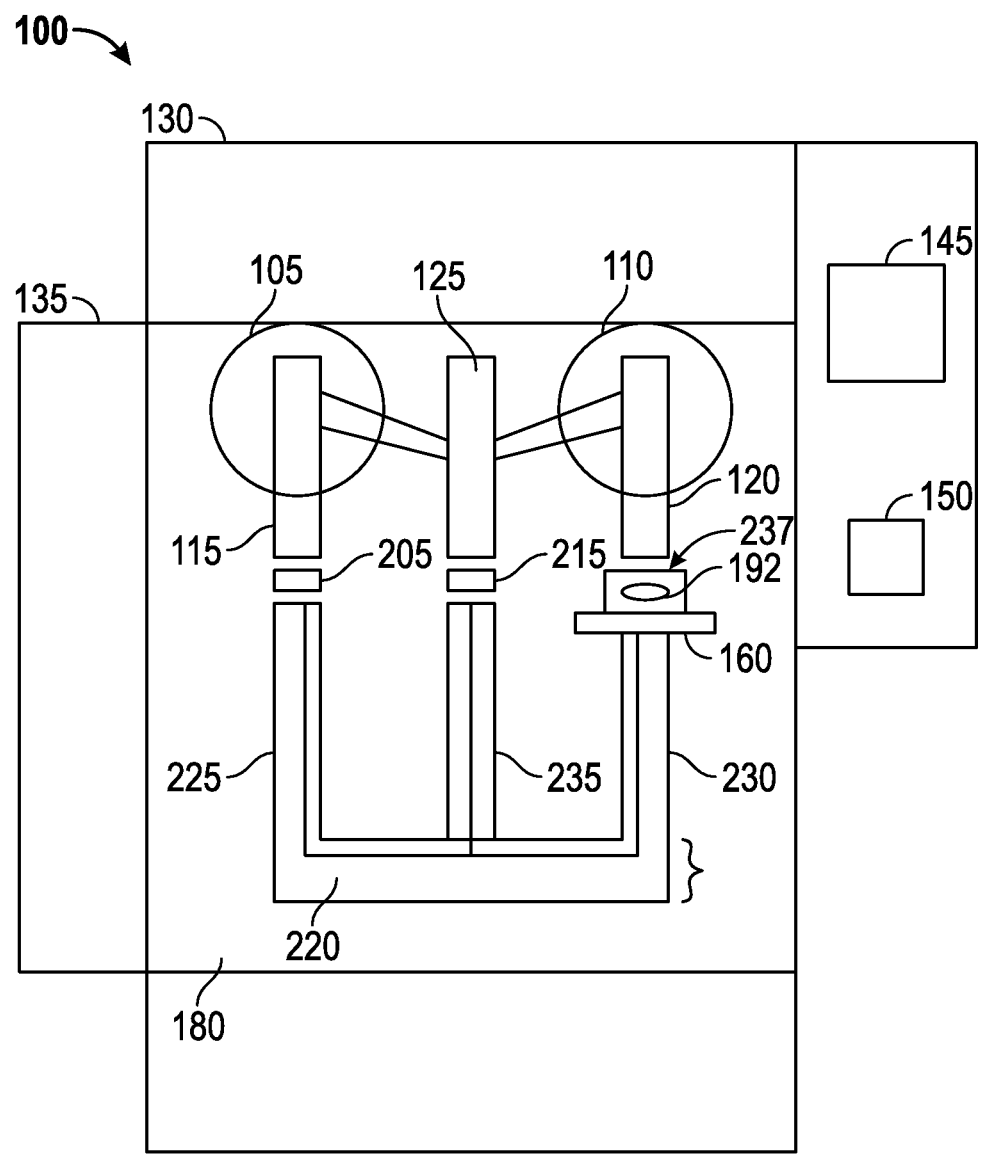
FIG. 3 is a front view of the vending machine of FIG. 1 with the front door open and the movable platform in a second position.

Referring to FIGS. 1-3, an automatic frozen food product vending machine 100 includes two freezer barrels 105 and 110. In some embodiments, each freezer barrel includes a horizontally elongated cylinder enclosing a cylindrical freezing chamber wherein an inner wall is cooled by refrigeration ducts. The freezing chamber contains an auger type blender or other mixing device for agitating and aerating a mixture within the freezing chamber. A dispensing nozzle or spigot 115 and 120 is fluidly connected to each of the freezer barrels 105 and 110, respectively, for dispensing frozen food product from the respective freezer barrel. A third spigot 125 is fluidly connected to both freezer barrels 105 and 110 to dispense a mixture of the frozen food products from the two freezer barrels 105 and 110 (e.g., "twist" soft-serve including both vanilla and chocolate soft serve). The freezer barrels 105 and 115 and other components of the vending machine 100 related to the production and dispensing of the frozen food product are conventional (e.g., those disclosed in U.S. Pat. No. 5,706,720, which is incorporated herein by reference in its entirety).

Vending machine 100 also includes a housing 130 and a front door 135 that moves between a closed position (shown in FIG. 1) and an open position (shown in FIGS. 2-3). In some embodiments, a container holder or dispenser 140 stores containers (e.g., cones, cups, dishes, bowls, etc.) of one or more sizes (e.g., small, medium, large, etc.). A user input device 145 (e.g., a touch screen, a keypad, multiple pushbuttons or switches, etc.) allows a user to make various inputs or selections related to the frozen food product to be prepared by the vending machine 100. A payment acceptor 150 (e.g., paper money, coins, magnetized credit or debit cards, tokens, tickets, coupons, etc.) receives the user's form of payment for the frozen food product to be prepared by the vending machine 100. In some embodiments, the payment acceptor 150 accepts payment in the form of a vending machine specific tender (e.g., tokens, tickets, coupons, magnetized card). For example, the payment acceptor 150 may accept tickets dispensed as a prize from a game of chance (e.g., skee ball, a basketball shooting game, or other carnival or fun-house games). As another example, tokens may be purchased by the user and redeemed for frozen food product by use of the vending machine 100.

The user is able to make a payment via the payment acceptor 150 and select a frozen food product to be prepared (e.g., both size and flavor). The user opens an access door 155 and places a container on a movable container platform 160. The user then closes the access door 155 and the movable platform 160 automatically moves the container beneath the spigot 115, 120, or 125 that provides the selected flavor. The selected flavor is then automatically dispensed in the appropriate amount (i.e., the selected size) into the container. In some embodiments, the spigots 115, 120, and 125 are opened and closed by linear actuators to dispense the appropriate amount of frozen food product. In some embodiments, the movable platform 160 moves downward during dispensing of the frozen food product. This movement may be to provide adequate spacing between the spigot and container for the amount of frozen food product being dispensed or to form "balls" of frozen food product in the container. The movable platform 160 then moves back in line with the access door 155 so the user can open the access door 155 to retrieve the container holding the frozen food product. The movable platform 160 is prevented from moving when the access door 155 is open. In some embodiments, lights, sounds, or other attractive features or entertainment devices are activated while the movable platform 160 is in motion.

Figure 4:
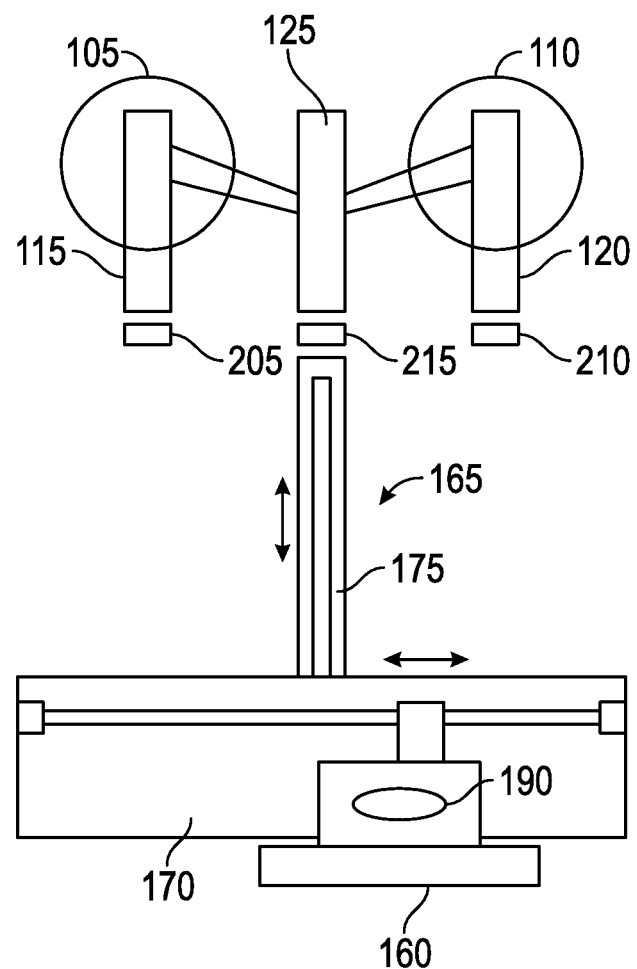
FIG. 4 is a front view of the vending machine of FIG. 1 with a face plate removed.

As shown in FIG. 4, the movable platform 160 is connected to a gantry 165 that is movable in a first direction (e.g., an x-direction) and a second direction substantially perpendicular to the first direction (e.g., a y-direction). Possible methods of motion for the gantry 165 include linear actuators, belt drives, solenoids, air cylinders, rack and pinion gears, cable drawn motion, stepper motors, and the like. In the illustrated embodiment, the gantry 165 includes a horizontally-arranged linear actuator 170 that moves the movable platform 160 in the x-direction and a vertically-arranged linear actuator 175 that moves the movable platform 160 in the y-direction. A face plate 180 (shown in FIGS. 1-3) typically covers the gantry 165 from view during normal operation of the vending machine 100.

Figure 5A:
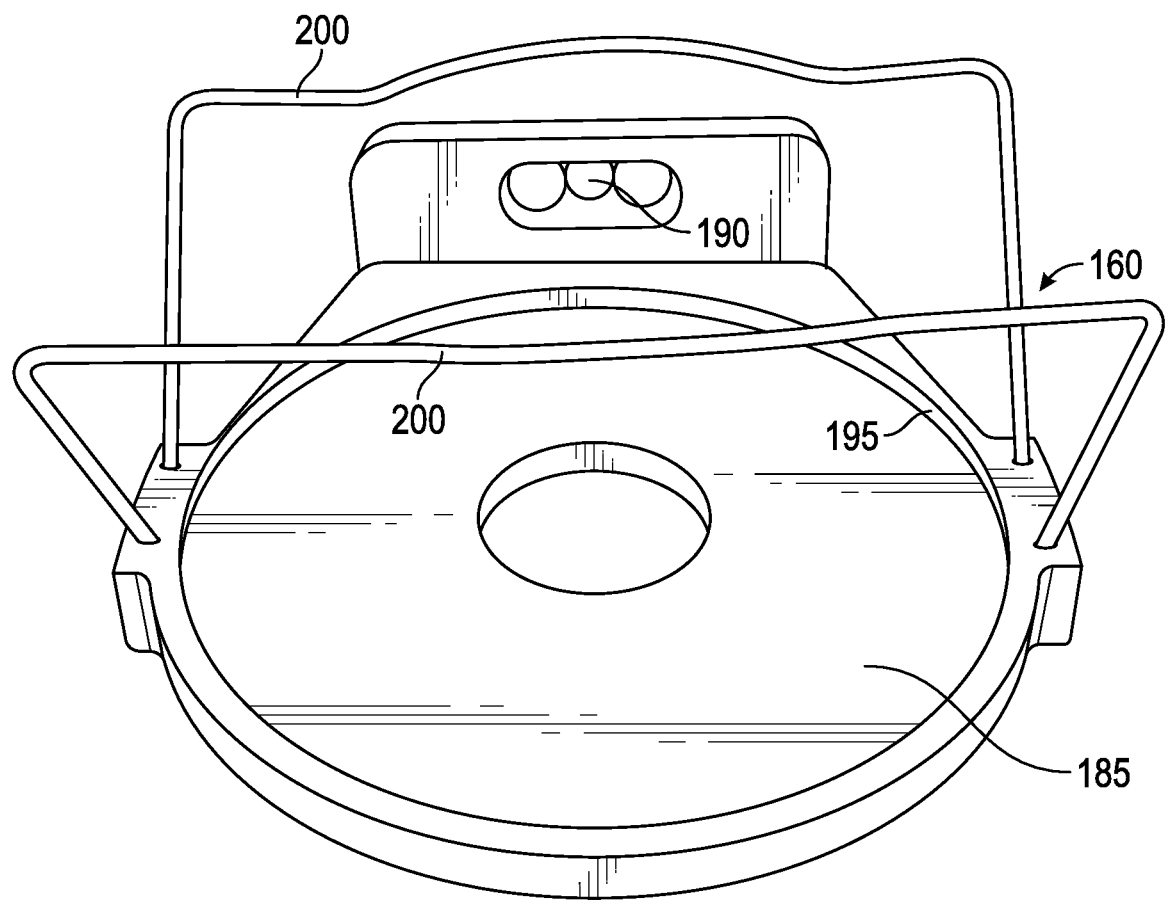
FIG. 5A is perspective view of the movable platform of the vending machine of FIG. 1.
Figure 5B:
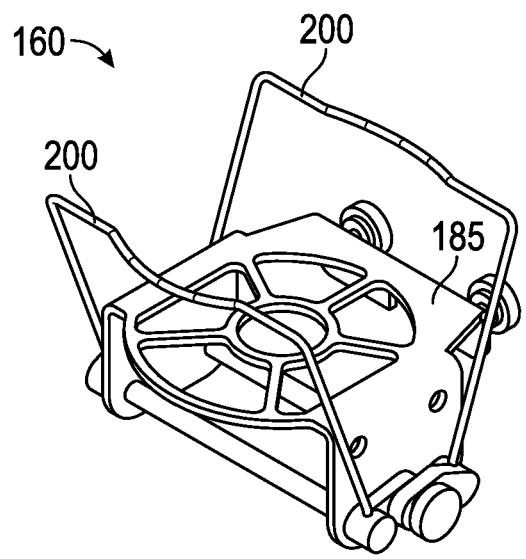
FIG. 5B is a perspective view of an alternative movable platform for use with the vending machine of FIG. 1.
Figure 5C:
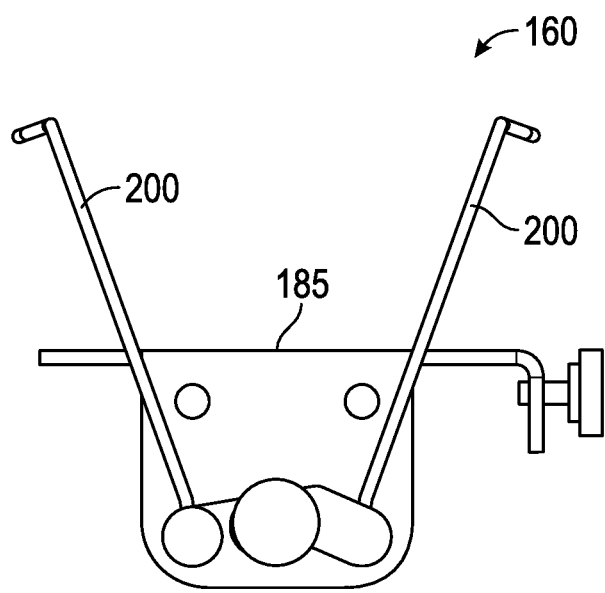
FIG. 5C is a side view of the movable platform of FIG. 5B.
Figure 5D:
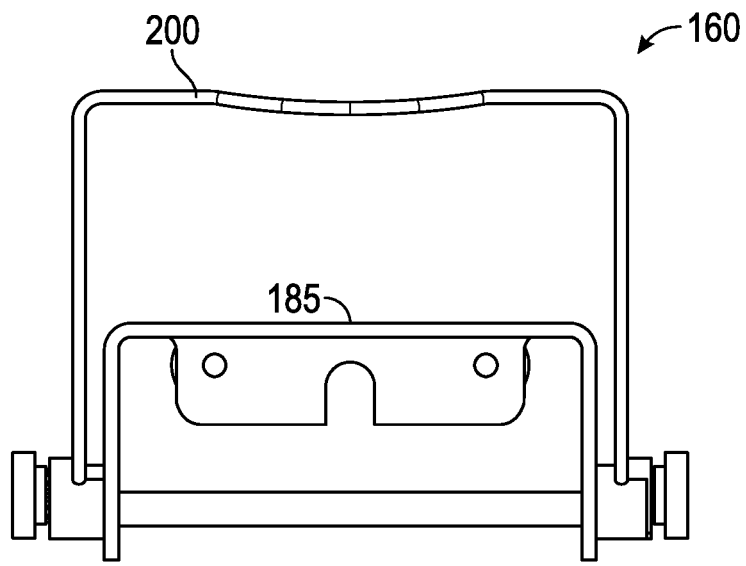
FIG. 5D is a front view of the movable platform of FIG. 5B.
Figure 5E:
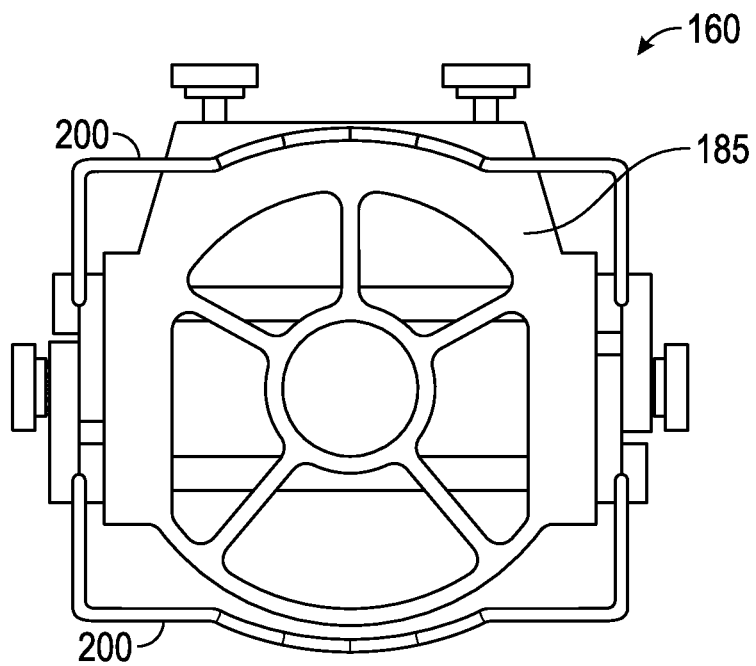
FIG. 5E is a top view of the movable platform of FIG. 5B.

As shown in FIG. 5A, the movable platform 160 includes a support surface 185 for supporting a container and a container proximity or presence sensor 190 for detecting when a container 192 is present on the support surface 185 (as shown in FIG. 2). In some embodiments, the support surface 185 is surrounded by a shoulder or lip 195 that helps to keep a container on the support surface. In some embodiments, one or more clips or retainers 200 secure a container to the movable platform 160. As shown in the FIGS. 5B-5E, in some embodiments, the clips 200 are mechanically adjustable to change the spacing between the clips 200 in order to accommodate different size containers. In some embodiments, the container presence sensor 190 may be a photoelectric sensor (a photo eye), an infrared sensor, an inductive sensor, a laser sensor, a limit switch, or other sensor suitable for detecting the presence of a container on the support surface 185.

Proximity or presence sensors 205, 210, 215 are positioned below each of the spigots 115, 120, and 125, respectively. The presence sensors 205, 210, 215 detect when a container on the movable platform 160 has reached a fill position below the corresponding spigot 115, 120, and 125, respectively. In some embodiments, the presence sensors 205, 210, 215 may be a photo eye, an infrared sensor, an inductive sensor, a laser sensor, a limit switch, or other sensor suitable for detecting the presence of a container (e.g., the presence of the top of the container). Movable platform 160 moves along a horizontal track 220 and three vertical tracks 225, 230, and 235 formed in the face plate 180. Each of the vertical tracks 225, 230, and 235 leads to the fill position beneath one of the spigots 115, 120, and 125, respectively.

Movable platform 160 can move between a home position (as shown in FIGS. 1 and 2) in which the movable platform 160 is inline with the access door 155 and the three fill positions. As shown in FIG. 3, the movable platform 160 is at the fill position below the spigot 120. As the movable platform 160 moves towards the appropriate spigot 115, 120, or 125 (in view of the user-selected flavor), the container 192 on the movable platform 160 is detected by the presence sensor 205, 210, or 215 below that spigot. This detection indicates that the movable platform 160 has arrived at the fill position. In some embodiments, the presence sensors 205, 210, and 215 detect the top of the container 192. After the movable platform 160 has reached the fill position, the appropriate spigot 115, 120, or 125 (i.e., the spigot above the fill position at which the movable container is located) dispenses frozen food product 237 into the container 192.

The amount of frozen food product dispensed into the container 192 may be determined in various ways, including by user input (e.g., a container size input made with the user input device 145), by the elapsed time for the movable platform 160 to move from the home position to the fill position, by weight (e.g., as detected by a weight sensor or scale), or by the number of accumulated steps of a stepper motor or stepper motors used to move the gantry 165 from the home position to the fill position.

Different size containers will result in different elapsed times from the time the movable platform 160 begins to move from the home position to the time the movable platform 160 stops movement at a fill position (i.e., when one of the presence sensors 205, 210, or 215 detects the container 192). The elapsed time for the movable platform 160 to move from the home position to the fill position with a relatively tall container (e.g., a large dish) will be less than the time to do so with a relatively short container (e.g. a small dish). The elapsed time required for the movable platform 160 to move from the home position to each of the fill positions for each of the sizes of containers offered for use with a specific vending machine 100 can be determined and these known elapsed times can then be used to determine the size of the container at the fill position based on an actual elapsed time. Similarly, the accumulated number of steps for a stepper motor or stepper motors the gantry 165 to move the movable platform 160 from the home position to the fill position may be used to determine the size of the container at the fill position based on a comparison to the known accumulated number of steps for the various fill positions and sizes of container offered for use with a specific vending machine. In some embodiments, the accumulated steps include the steps for an x-direction stepper motor and the steps for a y-direction stepper motor. In other embodiments, the accumulated steps include the steps for a single direction (e.g., the steps for a y-direction stepper motor).

This elapsed time and accumulated steps methods of container size indication can be used on their own to determine container size or can be used to verify that the user-selected container size (e.g., the container size input made via the user interface device 145) corresponds to the detected container size (e.g., as determined by the elapsed time or accumulated steps). This verification can prevent overfilling a container with too much frozen food product if the user has selected a larger size than the container that is on the movable platform 160. In the event of a mismatch, the container may be filled with the appropriate amount of frozen food product for the container size determined by the elapsed time or accumulated steps method or the movable platform 160 may return to the home position to receive a container of the user-selected size.

Vending machine 100 also includes a controller or processing circuit 240. The processing circuit 240 controls the operation of the vending machine 100 as described herein. The processing circuit 240 includes a processor 245 and memory 250.

Figure 6:
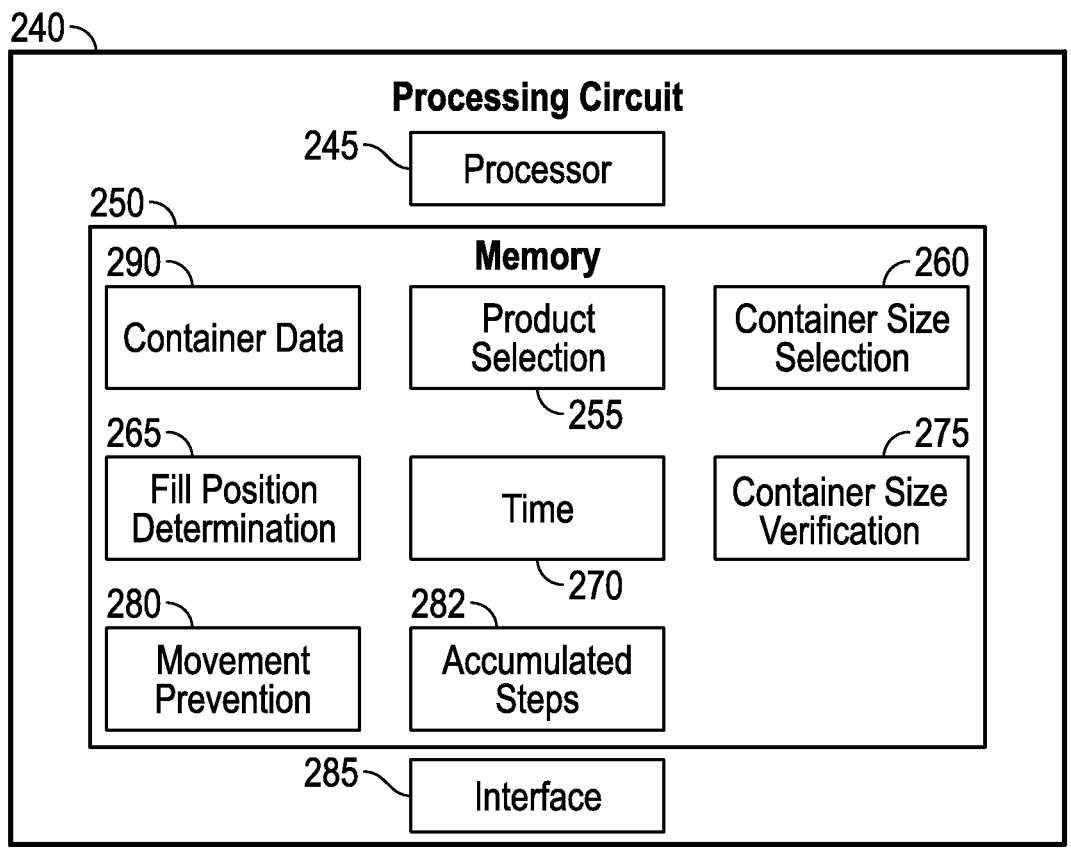
FIG. 6 is block diagram of a processing circuit configured to control the vending machine of FIG. 1.

Referring to FIG. 6, a block diagram of the processing circuit or processing electronics 240 is shown, according to an exemplary embodiment. The processor 245 may be or include one or more microprocessors (e.g., CPUs, GPUs, etc.), an application specific integrated circuit (ASIC), a circuit containing one or more processing components, a group of distributed processing components (e.g., processing components in communication via a data network or bus), circuitry for supporting a microprocessor, or other hardware configured for processing data. The processor 245 is also configured to execute computer code stored in memory 250 to complete and facilitate the activities described herein. Memory 250 can be any volatile or non-volatile computer-readable storage medium, or combinations of storage media, capable of storing data or computer code relating to the activities described herein. For example, memory 250 is shown to include computer code modules such as a frozen food product selection module 255, a container size selection module 260, a fill position determination module 265, a timer module 270, a container size verification module 275, a movement prevention module 280, and an accumulated steps module 282. When executed by the processor 245, the processing circuit 240 is configured to complete the activities described herein.

The processing circuit 240 also includes a hardware interface 285 for supporting the execution of the computer code frozen food product selection module 255, a container size selection module 260, a fill position determination module 265, a timer module 270, a container size verification module 275, a movement prevention module 280, and an accumulated steps module 282. An interface 285 may include hardware configured to receive data as input to the processing circuit 240 (e.g. from the user input device 145, the payment acceptor 150, and/or the presence sensors 190, 205, 210, and 215) and/or communicate data as output to another computing device (e.g., to a display). For example, the processing circuit 240 may receive container data 290 from one or more sensors (e.g., the presence sensors 190, 205, 210, and 215). The interface 285 may include circuitry to communicate data via any number of types of networks or other data communication channels. For example, the interface 285 may include circuitry to receive and transmit data via a wireless network or via a wired network connection. In another example, the interface 285 may include circuitry configured to receive or transmit data via a communications bus with other electronic devices.

Memory 250 may include container data 290. In general, container data 290 may include any data relating to the characteristics of the containers to be used with the vending machine 100. In some embodiments, container data 290 may include sensor data generated by one or more of the presence sensors 190, 205, 210, and 215 associated with the vending machine 100. Sensor data may include, but is not limited to, data regarding the presence of a container at one or more of the presence sensors 190, 205, 210, and 215. Container data 290 may also include user-provided data. User-provided data may include, but is not limited to, data regarding the container size selected by the user (e.g., via the user input device 145), payment for the desired frozen food product (e.g., via the payment acceptor 150), the frozen food product selected by the user, which spigot provides the selected frozen food product and the location of this spigot relative to the home position of the movable platform, known elapsed times for the movable platform 160 to move from the home position to a fill position while supporting a known type and size of container, and data regarding the components of the vending machine 100 to be controlled by the processing circuit 240.

Memory 250 may include product selection module 255. Product selection module 255 may be configured to identify the frozen food product selected by a user via the user input device 145. Such a selection can be made based on the flavor of the desired frozen product dispensed by the spigots 115, 120, and 125 (e.g., vanilla, chocolate, and twist) or based on the location of the spigot 115, 120, or 125 (e.g., left, right, and center) that dispenses the desired flavor of frozen food product. Product selection module 255 may be further configured to determine if sufficient funds have been deposited to pay for the selected frozen food product. In some embodiments, the vending machine specific tender (e.g., tokens, tickets, coupons, magnetized card) accepted by the payment acceptor 150 may be associated with a specific frozen product flavor or location.

Memory 250 may include container size selection module 260. Container size selection module 260 may be configured to identify the size and/or type of container selected by a user via the user input device 145. Such a selection may indicate a size of container (e.g., small, medium, large) to be filled with the selected frozen food product. Such a selection may also indicate a type of container (e.g., dish, cone, bowl, etc.) to be filled with the selected frozen food product. Container size selection module 260 may be further configured to determine the amount of frozen food product to be dispensed based on the selected container size and type (i.e., frozen food product portion size). The amount may be controlled by a dispense time (e.g., elapsed time that the appropriate spigot 115, 120, or 125 is open), by weight (e.g., as sensed by a weight sensor), by flow rate (e.g., as sensed by a flow sensor), or other appropriate method. Container size selection module 260 may be further configured to determine if sufficient funds have been deposited to pay for the selected container size and/or type. In some embodiments, the vending machine specific tender (e.g., tokens, tickets, coupons, magnetized card) accepted by the payment acceptor 150 may be associated with a specific container size and/or type. Container size selection module 260 may also make an adjustment to the frozen food product portion size based on the elapsed time between dispensing cycles. Frozen food product may expand (e.g., increase in volume and/or weight) the longer it sits in a freezer barrel 105 or 110 of the vending machine 100. Accordingly, the frozen food product portion size may be adjusted to decrease the portion size based on the time elapsed between dispensing cycles (e.g., the longer the time between dispensing cycles, the greater the decrease in the portion size).

Memory 250 may include fill position determination module 265. Fill position determination module 265 may be configured to determine to which of the three fill positions (i.e., one under each spigot 115, 120, and 120) the movable platform 160 will move from the home position. This determination may be made in response to inputs from the product selection module 255 and the container size selection module 260. Fill position determination module 265 may be further configured to track or otherwise determine the position of the movable platform 160 (e.g., based on position of linear actuators 170 and 175, based on inputs from presence sensors 205, 210, and 215, based on step count of stepper motor or motors used to move the gantry 165, etc.).

Memory 250 may include timer module 270. Timer module 270 is configured to track the elapsed time for the movable platform 160 to move from the home position to one of the fill positions.

Memory 250 may include container size verification module 275. Container size verification module 275 may be configured to compare known elapsed times for the movable platform 160 to move from the home position to a fill position while supporting a known type and size of container to the actual elapsed time tracked by the timer module 270. This comparison can be used to verify that the type and size of the container on the movable platform 160 matches the selected type and size of container (e.g., as identified by the container size selection module 260). If the selected container size and type is not verified, the frozen food product is not dispensed and the movable platform 160 returns to the home position to receive the correct size and type of container, or the correct amount of frozen food product based on the elapsed time is dispensed, rather than the amount called for based on the user selection. Alternatively, container size verification module 275 may be configured to function as the container size selection module 260 so that the container size is identified based on the comparison of the actual and known elapsed times for the movable platform 160 to move from the home position to a fill position while supporting a known type and size of container.

Memory 250 may include movement prevention module 280. Movement prevention module 280 may be configured to prevent movement of the movable platform 160 and the gantry 165 when the front door 135 or the access door 155 is open. Movement prevention module 280 may be further configured to prevent movement of the movable platform 160 and the gantry 165 when the vending machine 100 is in other configurations (e.g., the face plate 180 is not properly attached, a rear door is open, etc.). Alternatively or additionally, movement prevention module 280 may be a hard-wired interlock, rather than a computer code module, configured to prevent movement of the movable platform 160 and gantry 165 when the front door 135 or the access door 155 is open.

Memory 250 may include accumulated steps module 282. Accumulated steps module 282 is configured to count the accumulated steps for the gantry 165 to move the movable platform 160 from the home position to one of the fill positions. One or more stepper motors (e.g., one for movement in the x-direction and one for movement in the y-direction) may be used to move the gantry 165. Accumulated steps module 282 may itself count the number of accumulated steps or may receive an input from the stepper motor indicating the number of accumulated steps.

Figure 7:
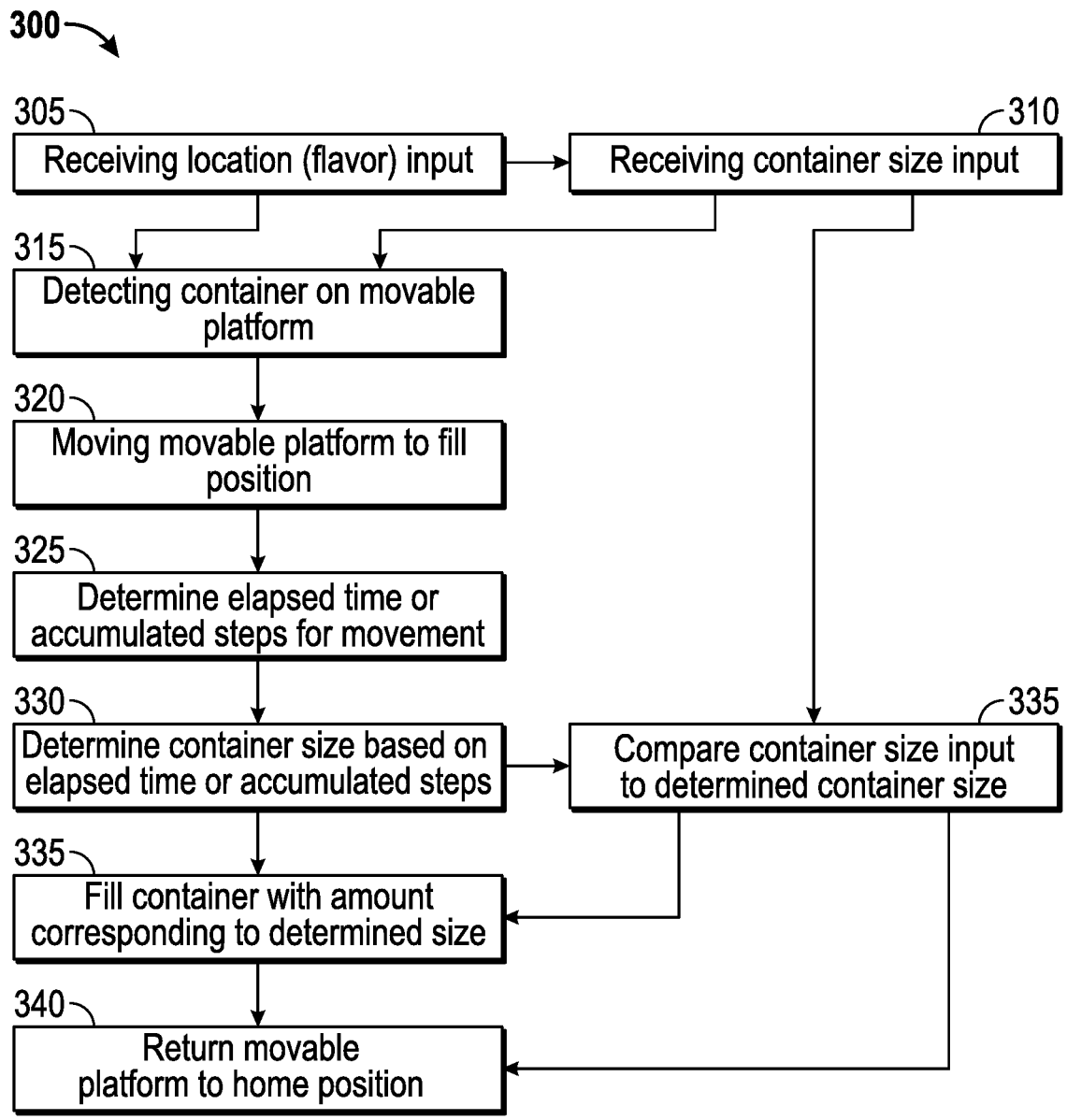
FIG. 7 is a flow chart of a method of operating an automatic frozen food product vending machine according to an exemplary embodiment.
Figure 8:
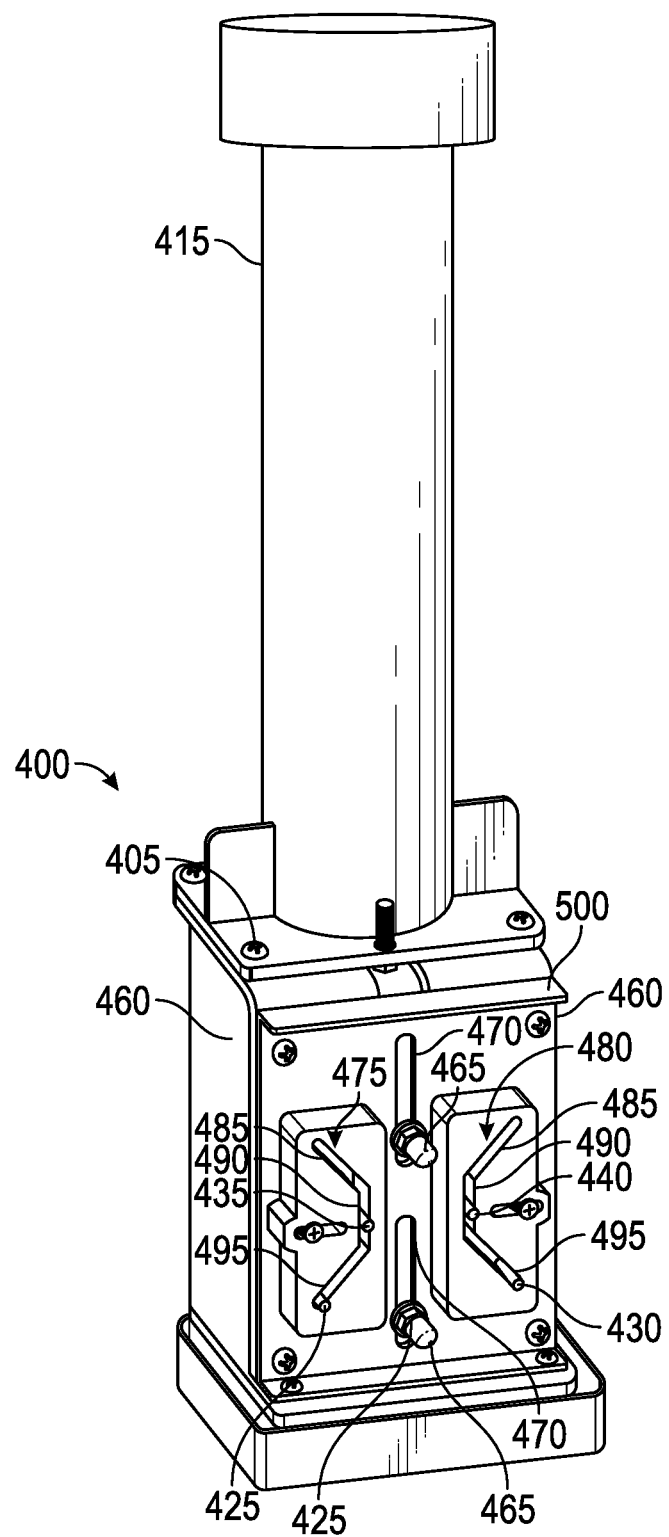
FIG. 8 is a perspective view of an automatic ice cream cone dispenser according an exemplary embodiment.

FIG. 7 illustrates a method of operating an automatic frozen food product vending machine (e.g., the vending machine 100), according to an exemplary embodiment. The method 300 includes receiving a location input from a user input device (e.g., the user input device 145) (step 305). The location corresponds to one of three spigots (e.g., the spigots 115, 120, and 125) and/or the corresponding flavor dispensed by the selected spigot (e.g., vanilla, chocolate, or twist). In some embodiments, a container size input is received from the user input device (e.g., the user input device 145) (step 310). The user then opens an access door (e.g., the access door 155), places a container of the selected size onto a movable platform (e.g., the movable platform 160), and closes the access door. The presence of the container on the movable platform is detected (e.g., by presence sensor 190) (step 315). The movable platform then moves to the appropriate fill position for the location input (step 320). The elapsed time or accumulated steps of one or more stepper motors for this movement is determined (step 325). The size of the container on the movable platform is determined based on a comparison of known elapsed times or accumulated steps for the movable platform to move from the home position to the fill position while supporting a known type and size of container to the actual elapsed time or accumulated steps (step 330). In some embodiments, a comparison of the container size input and the container size determined by the elapsed time or accumulated steps is made (step 335). In some embodiments, if this comparison indicates a mismatch, the moving platform may return to the home position to receive the correct size container (step 340). In other embodiments, if the comparison verifies the correct container size or if the comparison identifies a mismatch, the container is filled with the amount of frozen food product corresponding to the determined container size (step 345). After the container is filled with frozen food product, the movable platform returns to the home position (step 340), where the user can open the access door to receive the container filled with the selected frozen food product. In some embodiments, the movable platform is prevented from moving when the access door is open. In some embodiments, lights, sounds, or other attractive features or entertainment devices are activated while the movable platform 160 is in motion and/or while the frozen food product is being dispensed.

FIGS. 8-12 illustrate an ice cream cone dispenser according to an exemplary embodiment. The dispenser 400 includes a housing 405 that defines a chamber 410. A chute 415 is attached to the housing 405 above the chamber 410. The chute 415 holds a stack of multiple ice cream cones 420 that are stacked one inside the next in a conventional manner. Each cone 420 includes a lip 422 that is vertically spaced apart from the lip of the adjacent stacked cone by a known distance. In some embodiments, multiple chutes are movably coupled to the housing. Each of the chutes holds a stack of multiple cones of different sizes and can be moved relative to the housing so that the cones in the chute above the chamber are the cones that will be dispensed by the dispenser 400.

Two pairs of rods are disposed within the chamber 410. The first pair of rods 425 and 430 is located vertically below the second pair of rods 435 and 440. A guide plate 445 receives an end of each of the rods 425 and 430 in a first horizontal guide path 450. In some embodiments, each of rods 425 and 430 is received in its own horizontal guide path and the two horizontal guide paths are collinear. The guide plate 445 also receives an end of each of the rods 435 and 440 in a second horizontal guide path 455. In some embodiments, each of rods 435 and 440 is received in its own horizontal guide path and the two horizontal guide paths are collinear. The horizontal guide paths 450 and 455 restrict the movement of the rods 425 and 430, and 435 and 440, respectively.

A movable actuator 460 is coupled to the housing 405 opposite the guide plate 445. One or more protrusions 465 from the housing 405 are received in a vertical guide path 470 in the actuator 460 to limit the actuator 460 to vertical movement relative to the housing 405. The actuator 460 also includes two rod guide paths 475 and 480. The rod guide path 475 receives the second end of rods 425 and 435. The rod guide path 480 receives the second end of rods 430 and 440. Each of the rod guide paths 475 and 480 include a first angled portion 485, a straight portion 490, and a second angled portion 495. Vertical movement of the actuator 460 causes the rod guide paths 475 and 480 to move relative to the rods 425, 430, 435, and 440. The guide paths 475 and 480 move the pairs of rods between two positions: a wide position where the rods 425 and 430 or 435 and 440 are horizontally spaced apart a distance wider than the outer diameter of the lips 422 of the cones 420 and a narrow position where the rods 425 and 430 or 435 and 440 are spaced apart a distance narrower than the outer diameter of the lips 422 of the cones 420 to support a cone 420 (e.g., so that the lip 422 of a cone 420 rests on top of the rods). In some embodiments, each of the rod guide paths 475 and 480 is formed in its own block of material capable of supporting the rods and allowing for easy movement of the rods (e.g., a nylon or plastic block).

In the illustrated embodiment, the actuator 460 includes a lip 500 that can be grasped by a user to move the actuator 460 vertically. In some embodiments, the actuator 460 is moved automatically (e.g., by a linear actuator, a piston, a motor-driven gear rack, or other appropriate device). By moving the actuator 460 up and down, the pairs of rods support and then release successive cones 420 in the stack. In some embodiments, a spring biases the actuator 460 towards a position (e.g., towards a lowered position). In some embodiments a damper or dash pot is used to dampen the movement of the actuator 460.

FIGS. 9-12 illustrate the chamber 410 with the actuator 460 removed for clarity (on the left of the figure) and the actuator 460 (on the right of the figure). FIGS. 9-12 show the position of the rods 425, 430, 435, and 440 and the actuator 460 during a single cycle of the dispenser 400. The stack of cones 420 are represented by three cones 420A, 420B, and 420C.

Figure 9:
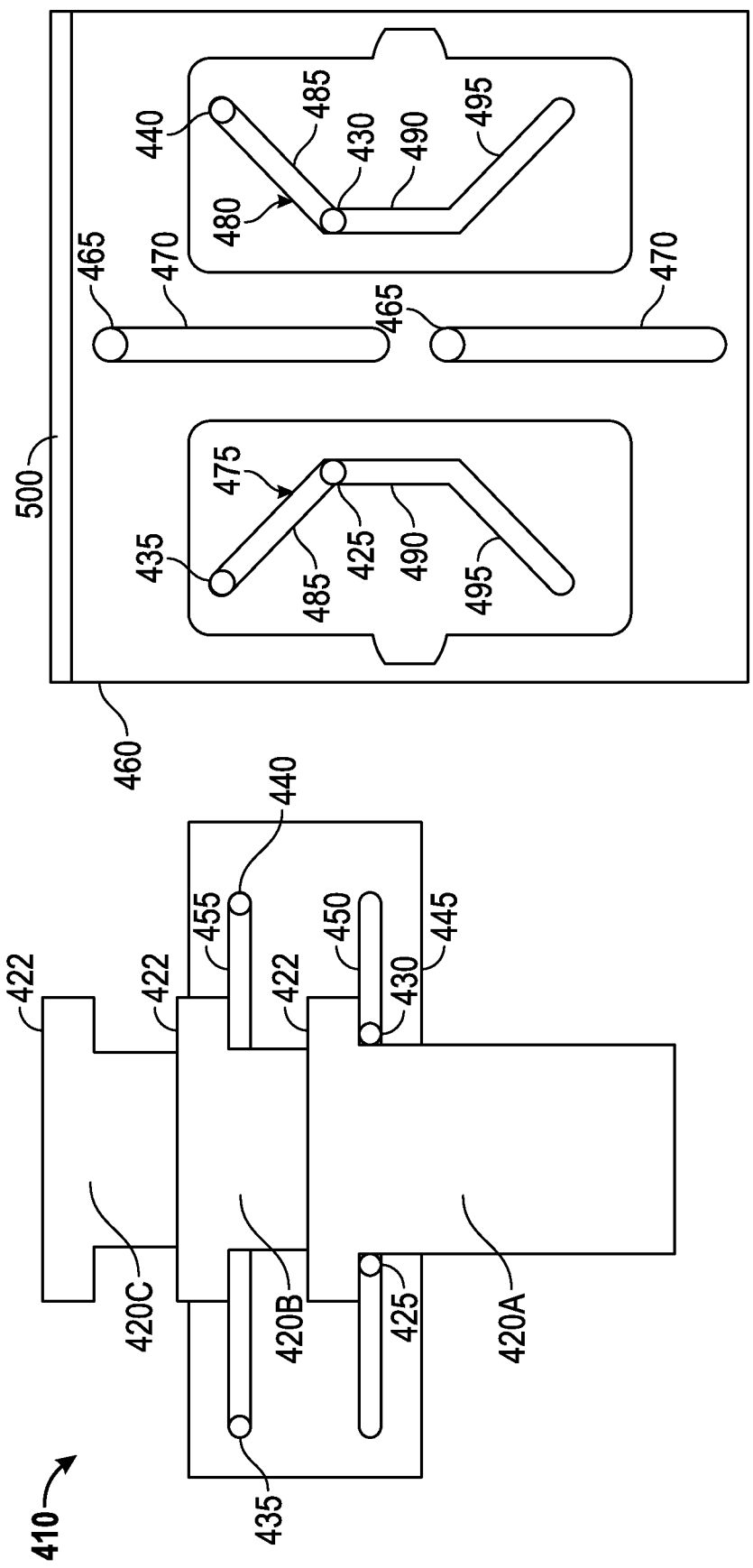
FIG. 9 is a front view of a chamber and an actuator of the dispenser of FIG. 8, with the actuator in a first position.

As shown in FIG. 9, the rods 425 and 430 are positioned in the narrow position by the straight portions 490 of the guide paths 475 and 480 so that the cone 420A is supported by the rods 425 and 430. The rods 435 and 440 are positioned in the wide position by the first angled portions 485 of the guide paths 475 and 480 and are not in contact with any of the cones 420.

Figure 10:
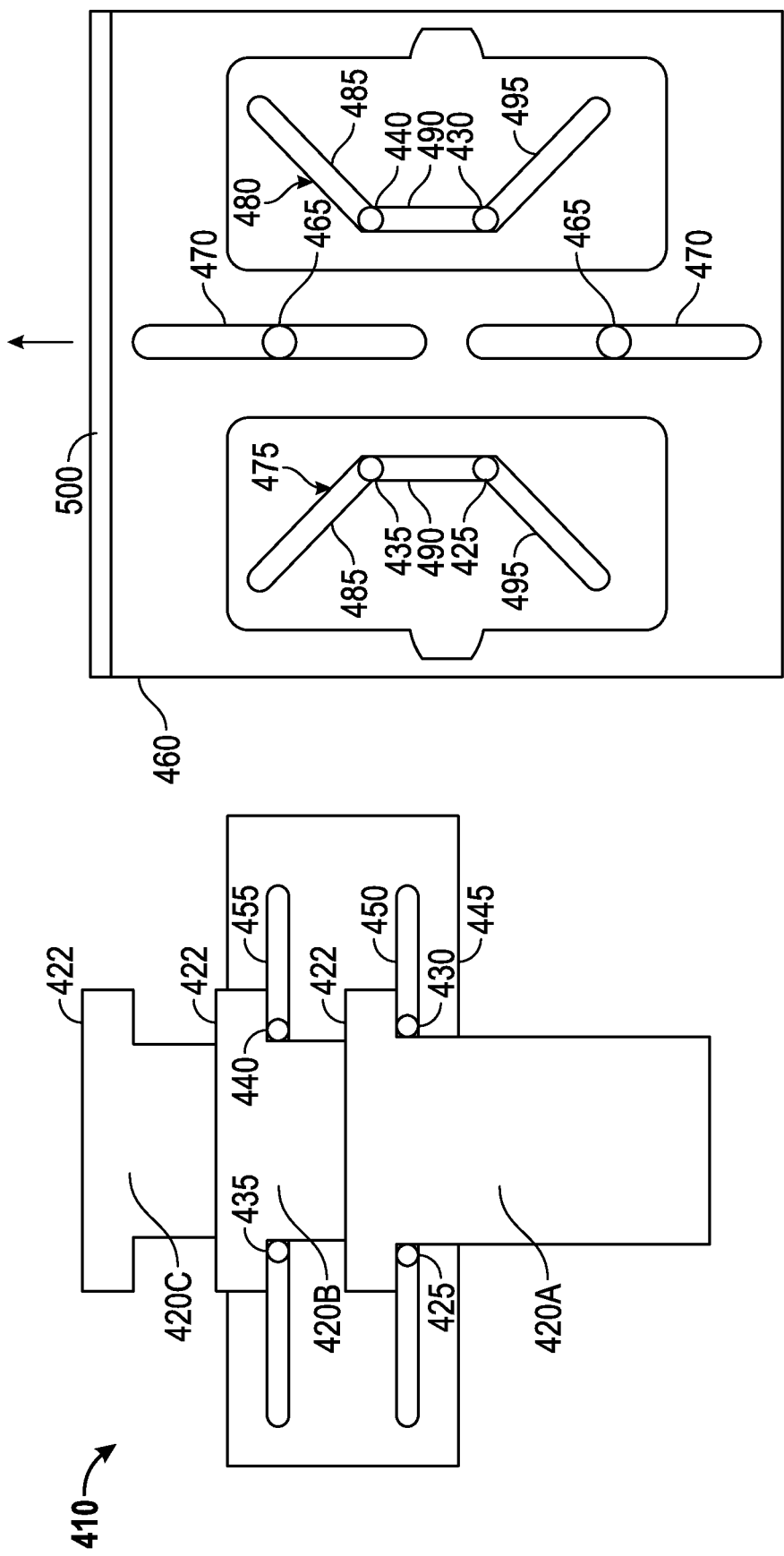
FIG. 10 is a front view of the chamber and the actuator of the dispenser of FIG. 8, with the actuator in a second position.

As shown in FIG. 10, as the actuator 460 is moved upwards, the rods 425 and 430 are maintained in the narrow position by the straight portions 490 of the guide paths 475 and 480 to continue to support the cone 420A and the rods 435 and 440 are moved to the narrow position by the straight portions 490 of the guide paths 475 and 480 so that the cone 420B is supported by the rods 435 and 440.

Figure 11:
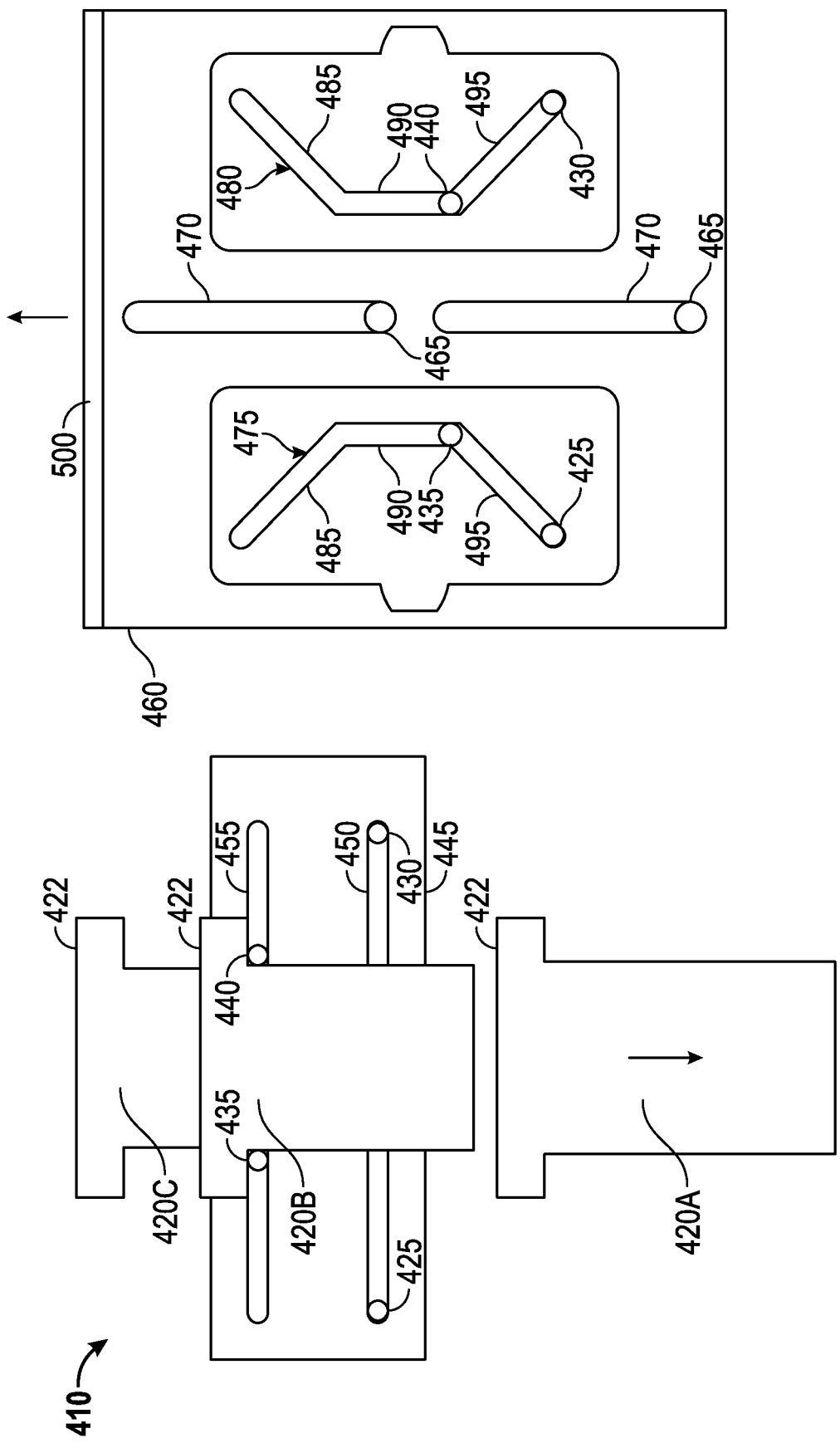
FIG. 11 is a front view of the chamber and the actuator of the dispenser of FIG. 8, with the actuator in a third position.

As shown in FIG. 11, as the actuator 460 continues to move upwards, the rods 425 and 430 are moved to the wide position by the second angled portions 495 of the guide paths 475 and 480 to release the cone 420A, allowing it to exit the chamber 410. In some embodiments, the cone 420A is dispensed to a user's hand or a support surface. In some embodiments, the cone 420 is dispensed to a movable platform of an automatic frozen food product vending machine (e.g., vending machine 100). The rods 435 and 440 are maintained in the narrow position by the straight portions 490 of the guide paths 475 and 480 to continue to support cone 420B, so that only a single cone (cone 420A) is dispensed. In some embodiments, the vending machine 100 includes the dispenser 400. The movable food platform 160 moves to a container receiving position below the chamber 415 to receive a user-selected container and then cycles as described above to dispense the selected frozen food product. In some embodiments, the container receiving position and the home position share the same location.

Figure 12:
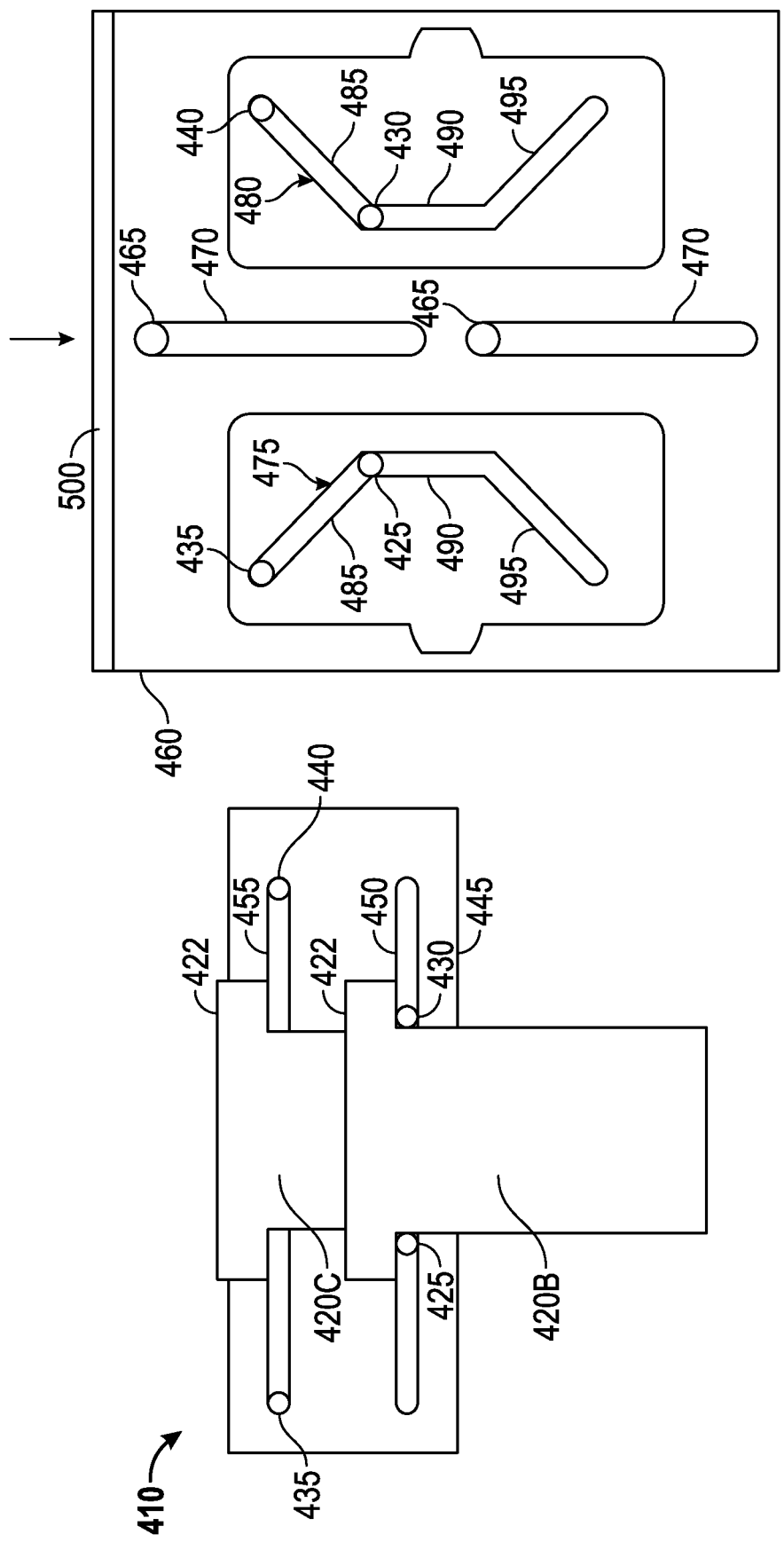
FIG. 12 is a front view of the chamber and the actuator of the dispenser of FIG. 8, with the actuator in the first position.

As shown in FIG. 12, the actuator 460 completes its cycle by moving downwards to its original position. The rods 435 and 440 are moved to the wide position by the first angled portions 485 of the guide paths 475 and 480 to release the cone 420B. The rods 425 and 430 are moved to the narrow position by the straight portions 490 of the guide paths 475 and 480 to support the cone 420B.

Alternatively, dispenser 400 may be configured to dispense containers other than ice cream cones (e.g., dishes, bowls, cups, or other food product containers) that are capable of being stacked and including lips similar to those described above for the cones 420.

Figure 13:
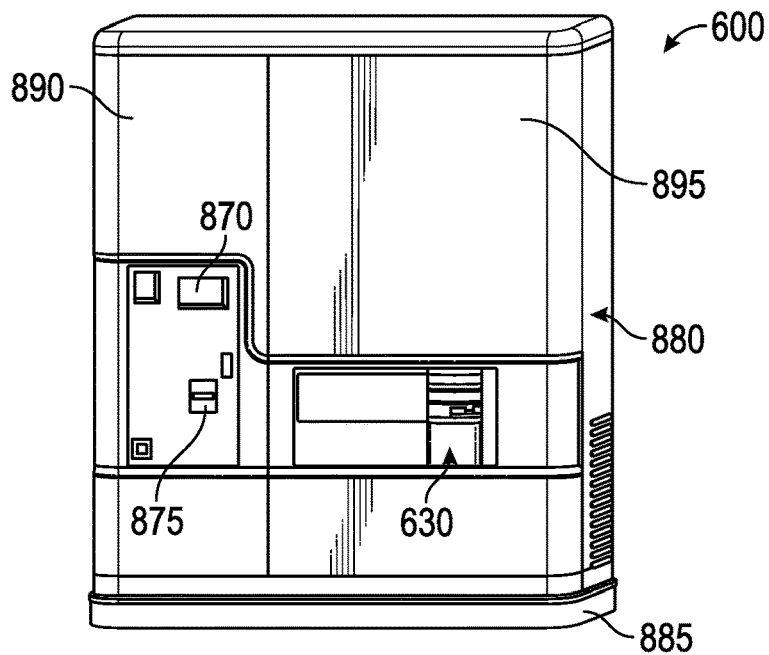
FIG. 13 is a perspective view of an automatic frozen food product vending machine according to an exemplary embodiment.
Figure 14:
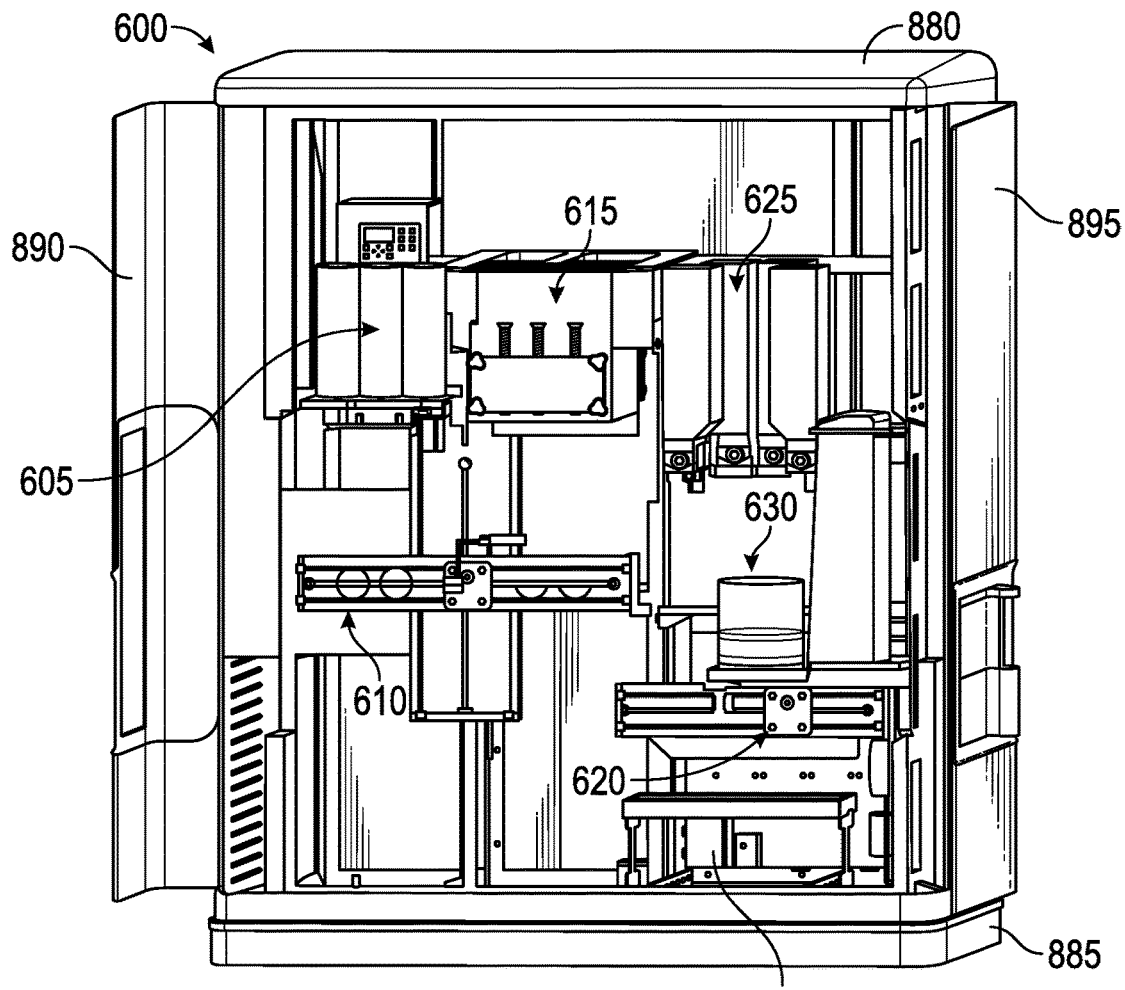
FIG. 14 is a perspective view of the vending machine of FIG. 13 with access doors open.
Figure 15:
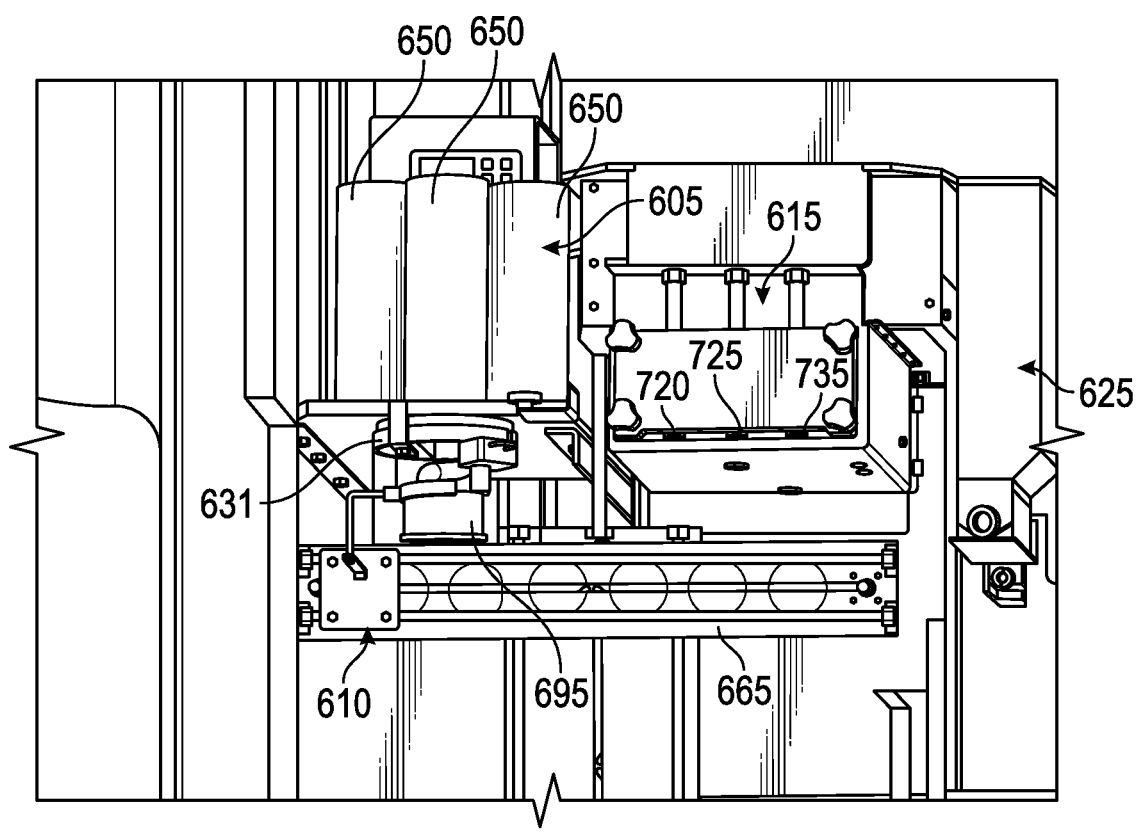
FIG. 15 is a perspective view of a portion of the vending machine of FIG. 13.
Figure 17:
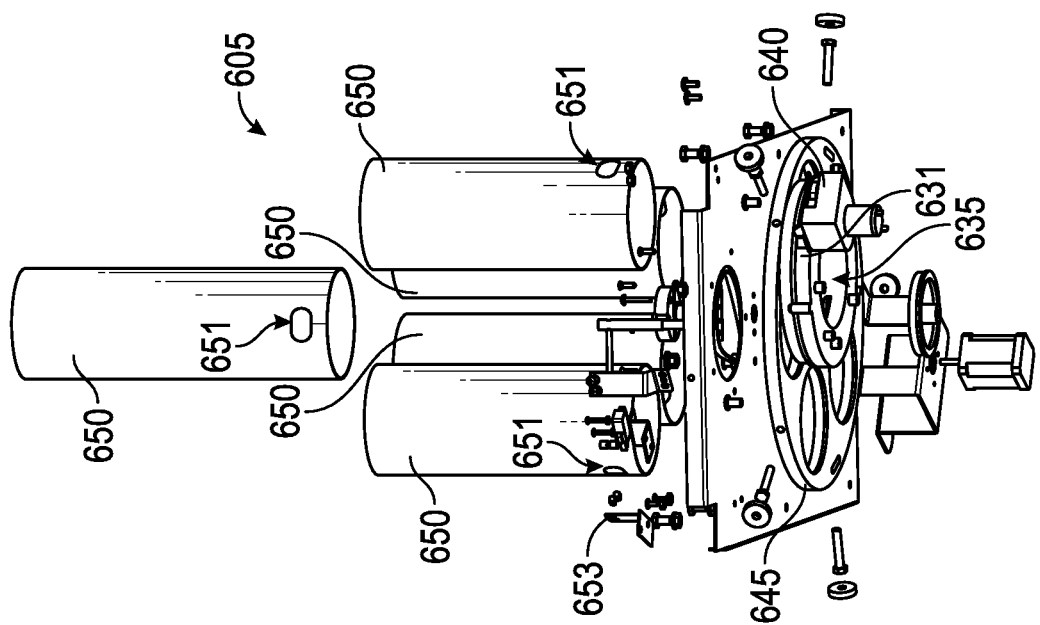
FIG. 17 is an exploded view of the container dispenser of FIG. 16.
Figure 16:
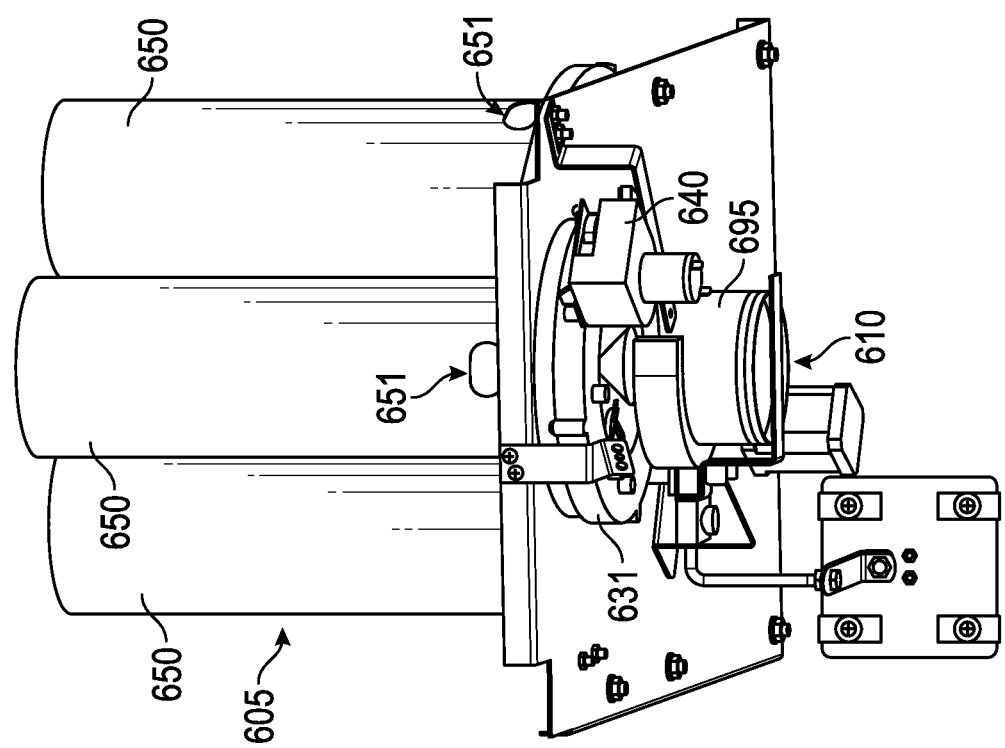
FIG. 16 is a perspective view of a container dispenser of the vending machine of FIG. 13.
Figure 18:
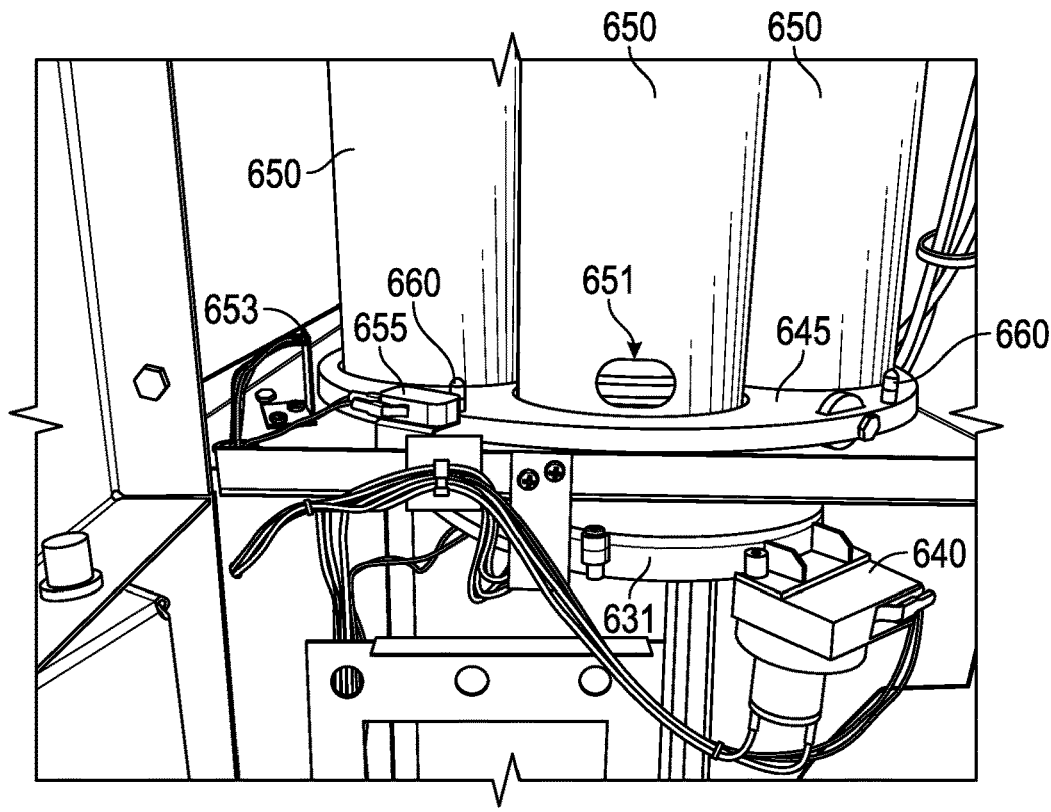
FIG. 18 is a perspective view of a portion of the vending machine of FIG. 13.

Referring to FIGS. 13-33 an automated or automatic frozen food product vending machine 600 is illustrated according to an exemplary embodiment. Vending machine 600 is similar to vending machine 100 described above, with particular details of vending machine 600 described below. Referring to FIGS. 13-14, vending machine 600 includes a container dispenser 605, a first movable platform 610, a frozen food product dispensing station 615, a second movable platform 620, a topping dispensing station 625, a user access station 630, and processing electronics 632 configured or programmed to control operation of vending machine 600.

Referring to FIGS. 15-18, container dispenser 605 is configured to store and dispense frozen food product containers a single container at a time. Containers include cups, dishes, cones, bowls, and other containers suitable for containing a frozen food product. In some embodiments, container dispenser 605 provides a single type of container in a size. In other embodiments, container dispenser 605 provides containers of different types and or sizes.

Container dispenser 605 includes a dispense mechanism 631 configured to dispense a single container at a time. Dispense mechanism 631 includes a dispense opening 635 through which containers are dispensed. In some embodiments, a system of cams support and release a single container at a time through the dispense opening 635 with the system of cams driven by a motor 640 or other appropriate actuator. Container dispenser 605 includes a rotating carousel 645. Carousel 645 supports multiple container sleeves 650. As illustrated, container dispenser 605 includes five container sleeves 650. In some embodiments, more or fewer container sleeves 650 are included. In some embodiments, only a single container sleeve is provided and carousel 645 is omitted. Each container sleeve 650 supports a stack of containers. Each container sleeve 650 includes an opening 651 that can be aligned with a container presence sensor 653 (e.g., a photoelectric sensor, laser sensor, etc.) configured to detect when a container is present at opening 651. Carousel 645 rotates so that one of the container sleeves 650 is aligned with the dispense opening 635 of dispense mechanism 631. A sleeve presence sensor 655 is used to detect when one of the container sleeves 650 is aligned with the dispense opening 650. As illustrated, presence sensor 655 is a limit switch that is contacted by a post 660 associated with each of the container sleeves 650. As carousel 645 rotates, post 660 contacts the limit switch 655 indicating that the container sleeve 650 associated with the post 660 is aligned with dispense opening 635. Processing electronics 632 described in more detail below, may be configured to track the quantity of containers remaining in each container sleeve 650 and cause carousel 645 to rotate when the active container sleeve 650 (i.e., the container sleeve 650 aligned with dispense opening 635) is empty (i.e., has no more containers) to move an inactive container sleeve 650 (i.e., one of the container sleeves 650 not aligned with dispense opening 635) that is stocked with containers (i.e., contains one or more containers) into the active position. In some embodiments, each container sleeve 650 is stocked with containers of the same size and type. In some embodiments, each container sleeve 650 is stocked with containers of different sizes and/or types. Processing electronics 632 may be configured to track size, type, and quantity of containers stored in each container sleeve 650 and rotate the appropriate container sleeve 650 into the active position to dispense the desired size and/or type of container. Processing electronics 632 may be configured to receive an input from container presence sensor 653 to determine if a container is present to be dispensed from container sleeve 605 or if container sleeve 650 is empty. Processing electronics 632 may be configured to operate dispense mechanism 631 (e.g., by activating motor 640 for the appropriate period of time or number of steps) to dispense a single container from the container sleeve 650 in the active position.

Referring to FIGS. 15 and 19-23, first movable platform 610 is configured to receive and support a dispensed container from container dispenser 605, move the dispensed container as necessary to receive the selected type and amount of frozen food product from frozen food product dispensing station 615, and move the dispensed container containing the dispensed frozen food product to transfer the dispensed container containing the dispensed frozen food product to second movable platform 620 for further handling. In some embodiments, only one movable platform is provided and the single movable platform is configured to receive and support a dispensed container from container dispenser 605, move the dispensed container as necessary to receive the selected type and amount of frozen food product from frozen food product dispensing station 615, move the dispensed container containing the dispensed frozen food product as necessary to receive the selected type and amount of one or more toppings from topping dispensing station 625, and move the dispensed container containing the dispensed frozen food product and toppings to a position to be transferred to user access station 630 or move transfer the dispensed container containing the dispensed frozen food product and toppings to a position for access and removal by a user.

In some embodiments, first movable platform 610 is similar to movable platform 160 as described above. First movable platform 610 is connected to a gantry 665 similar to gantry 165 described above. First movable platform 610 includes a base 670 and a support platform 675 attached to base 670. Support platform 675 includes an arm 680 and a grip portion 685. Arm 680 is L-shaped and includes a lower support 690 for supporting the bottom of a dispensed container 695. Grip portion 685 includes a fixed portion 700, which is shown as a substantially C-shaped wall, and a movable arm 705. Fixed portion 700 and movable arm 705 contact the sides of dispensed container 695 to position and secure dispensed container 695 on support platform 675. Movable arm 705 is movable between an open position in which a container may be removed from support platform 675 and a closed position in which container is secured to the support platform 675. A spring 710 biases movable arm 705 to the closed position. Arm 705 may be moved to the open position by causing first movable platform 610 to move in such a way that the arm 705 is contacted by a post or finger and movement of first movable platform 610 relative to the post causes arm 705 to move. Such a post may be received within a curve 715 formed in movable arm 705. First movable platform 610 may also include a weight sensor 720. Weight sensor 720 may be used to detect the presence of dispensed container 695 on support platform 675, the amount of frozen food product dispensed into dispensed container 695, and the amount of topping dispensed into dispensed container 695. In some embodiments, weight sensor 720 includes a strain gauge coupled to arm 680. As arm 680 moves relative to base 670, the strain gauge deforms, which is used to provide an input indicative of the weight of dispensed container, frozen food product, or toppings to processing electronics 632.

Figure 19:
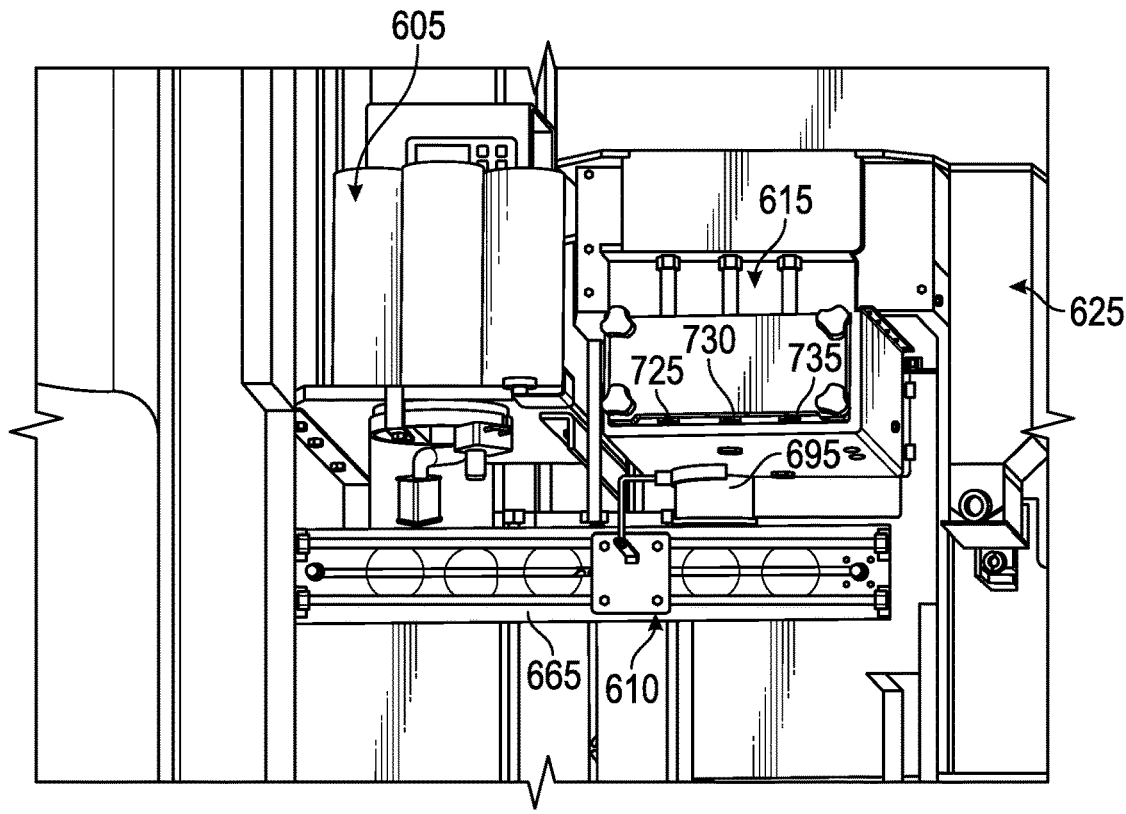
FIG. 19 is a perspective view of a portion of the vending machine of FIG. 13.
Figure 20:
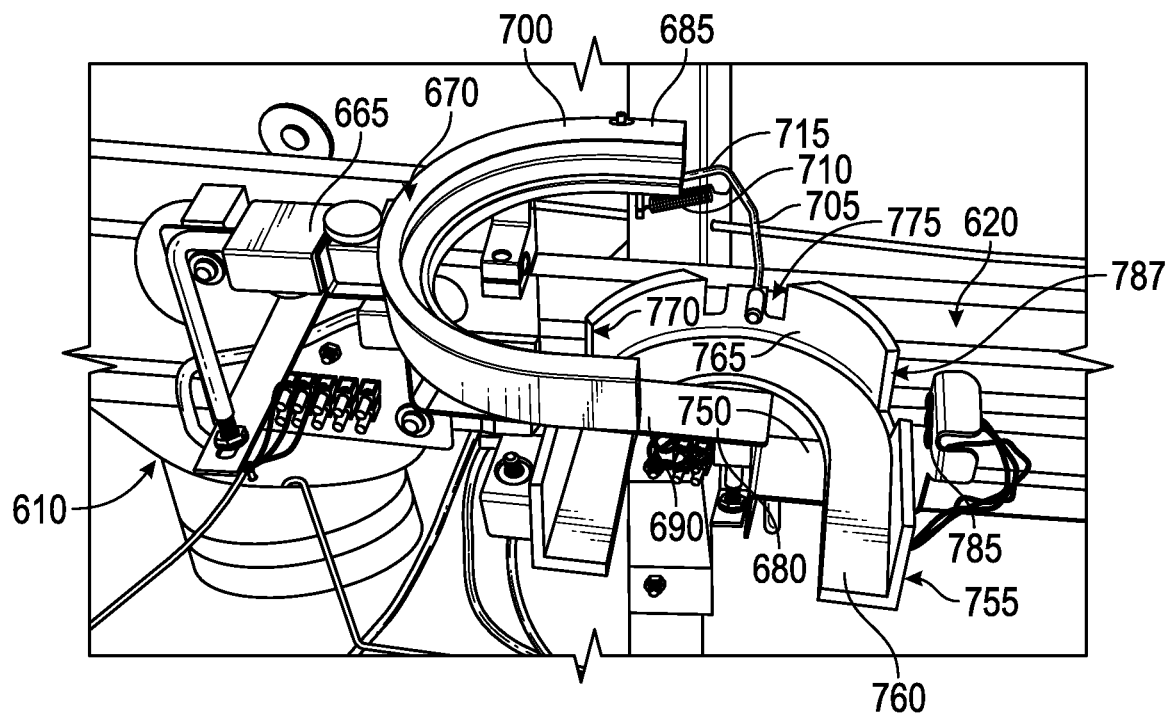
FIG. 20 is a perspective view of a portion of the vending machine of FIG. 13.
Figure 21:
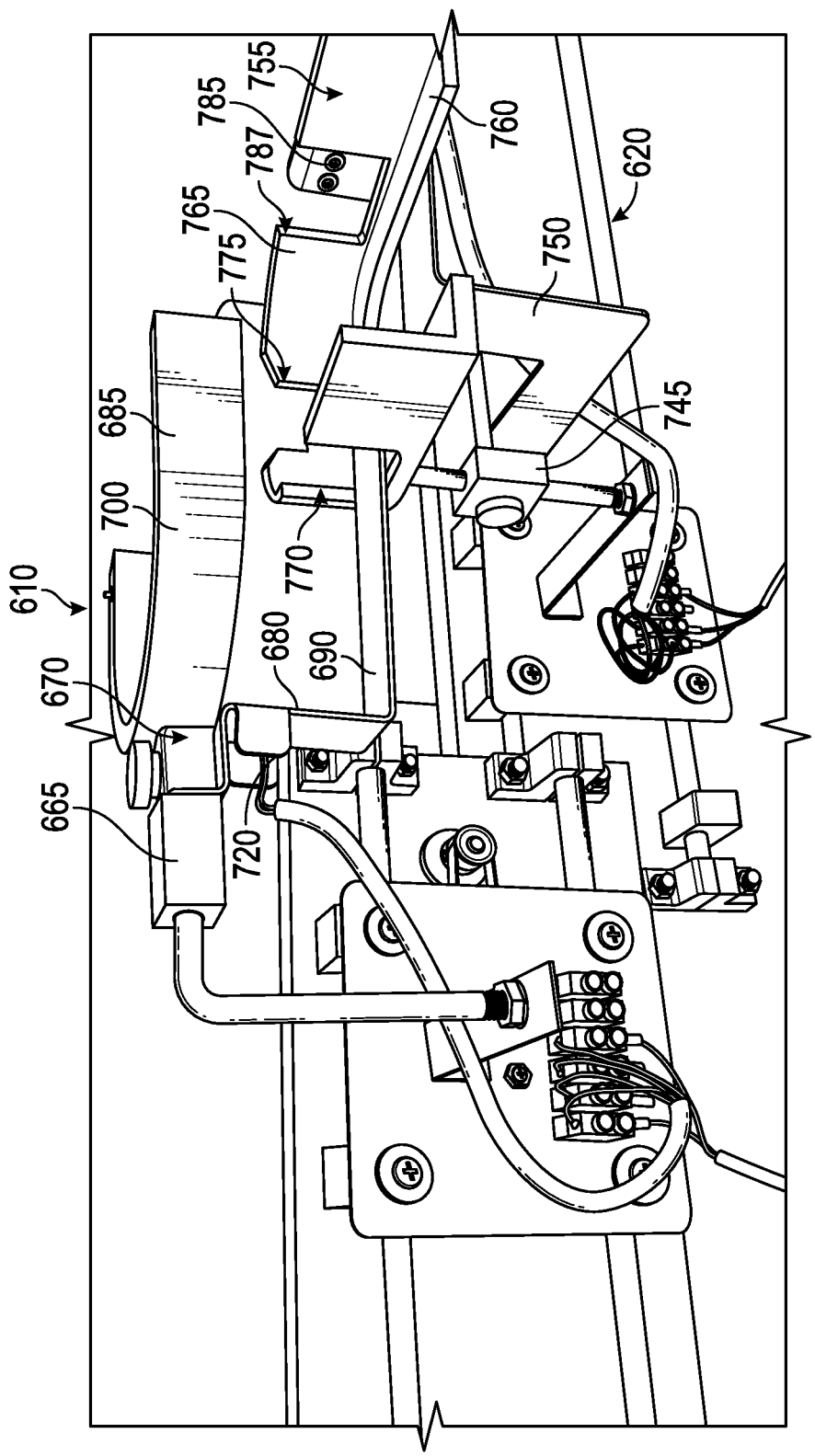
FIG. 21 is a perspective view of a portion of the vending machine of FIG. 13.
Figures 22, 23:
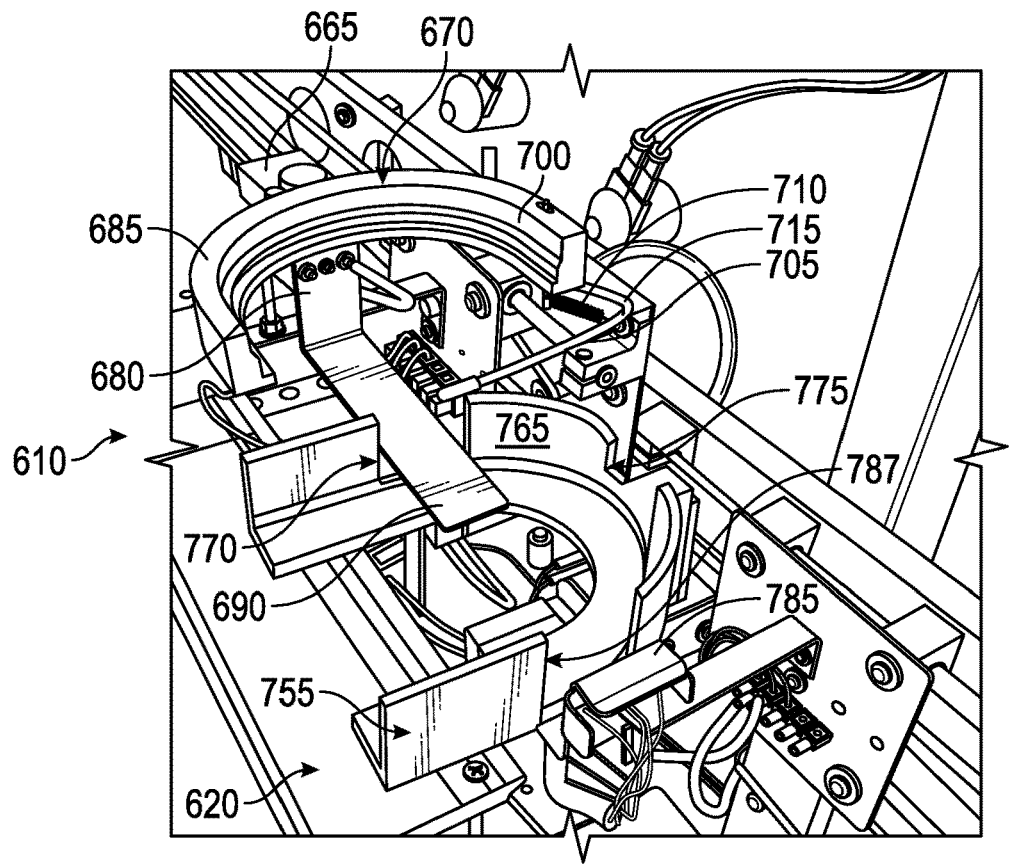
FIG. 22 is a perspective view of a portion of the vending machine of FIG. 13.
FIG. 23 is a perspective view of a portion of the vending machine of FIG. 13.
Figure 24:
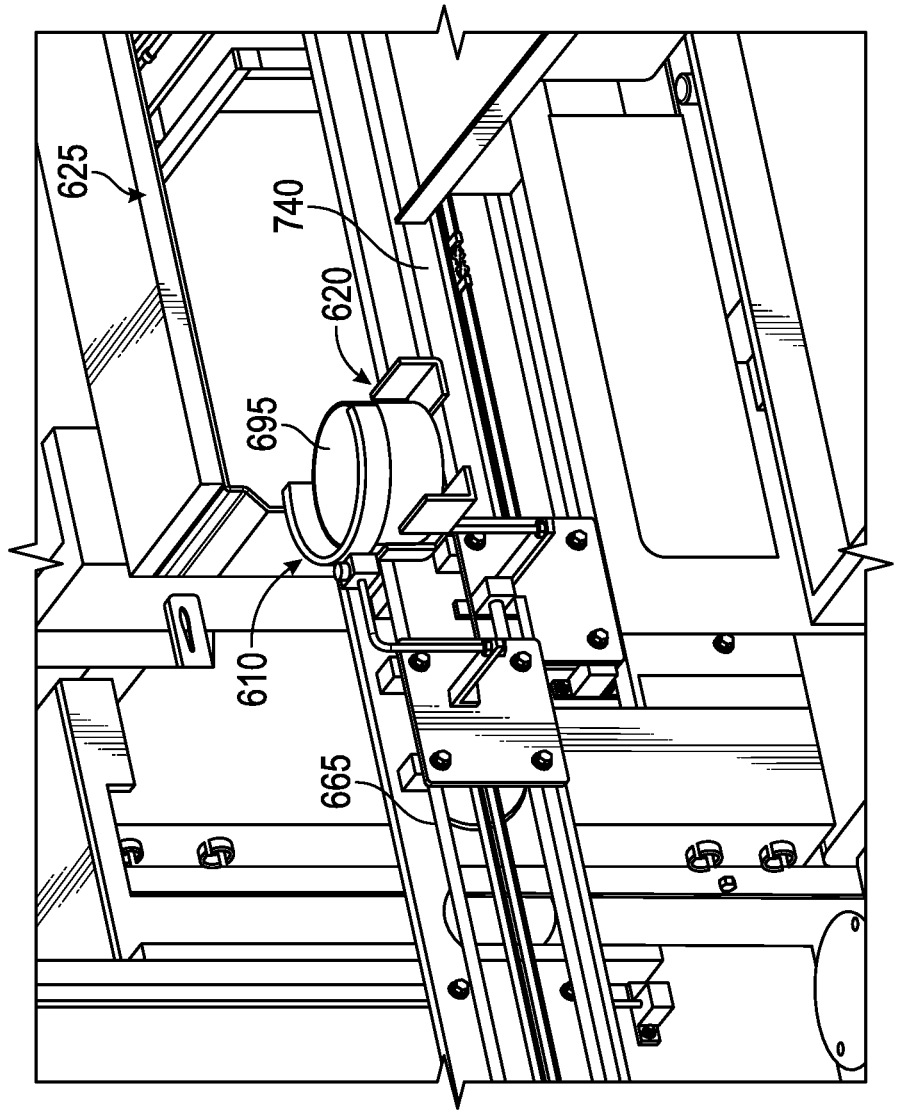
FIG. 24 is a perspective view of a portion of the vending machine of FIG. 13.

Referring to FIG. 19, frozen food product dispensing station 615 is configured to dispense at least one frozen food product. Different types of frozen food products include distinct food products (e.g., ice cream, custard, frozen yogurt, sherbets, sorbets, or other similar frozen food products) and/or distinct flavors of a frozen food product (e.g., vanilla, chocolate, strawberry, etc.).

In some embodiments, frozen food product dispensing station 615 is similar to the freezer barrel assembly described above with reference to FIGS. 1-3. Frozen food product dispensing station includes three spigots 725, 730, and 735 for dispensing frozen food product. In some embodiments, more or fewer (as few as a single spigot) are provided for dispensing frozen food product. For example, frozen food product dispensing machine may include three freezer barrels and six spigots for providing six different types of frozen food product (e.g., vanilla, chocolate, strawberry, vanilla-chocolate swirl, vanilla-strawberry swirl, and chocolate-strawberry swirl). Processing electronics 632 may control a valve, spigot, or other appropriate actuator to cause frozen food product dispensing station 615 to dispense the desired frozen food product. The amount of frozen food product dispensed can be detected based on the amount of time the product is being dispensed (e.g., time during which the valve is open), detected by a flow sensor, detected based on the weight of the dispensed food product (e.g., by weight sensor 720), or various combinations thereof.

Referring to FIGS. 20-24, second movable platform 620 is configured to receive the dispensed container containing the dispensed frozen food product from first movable platform 610, move the dispensed container containing the dispensed frozen food product as necessary to receive the selected type and amount of one or more toppings from topping dispensing station 625, and move the dispensed container containing the dispensed frozen food product and toppings to a position to be transferred to user access station 630.

In some embodiments, second movable platform 620 is similar to first movable platform 610 described above. A second gantry 740 is used to move second movable platform 620. Second movable platform 620 includes a base 745, an arm 750 and a support platform 755. Support platform 755 includes a floor 760 for supporting the bottom of dispensed container 695 and a grip portion 765. Grip portion 765 defines a wall that extends upward from floor 760 and is curved in order to position and secure dispensed container 695. The wall includes an opening or cut-out 770 sized to receive arm 680 of first movable platform 610 and a second opening or cut-out 775 sized to receive a pusher arm 780 for transferring dispensed container 695 from second movable platform 620 (described in more detail below). Second movable platform 620 may also include a presence sensor 785 to detect the presence of dispensed container 695 on second movable platform 620. In some embodiments, presence sensor 785 is a photoelectric sensor (a photo eye), an infrared sensor, an inductive sensor, a laser sensor, a limit switch, a weight sensor (e.g., similar to weight sensor 720), or other sensor suitable for detecting the presence of a container. The wall of grip portion 765 may include an opening or cut-out 787 to provide a line-of-sight between presence sensor 785 and a container supported by support platform 755.

Figure 26:
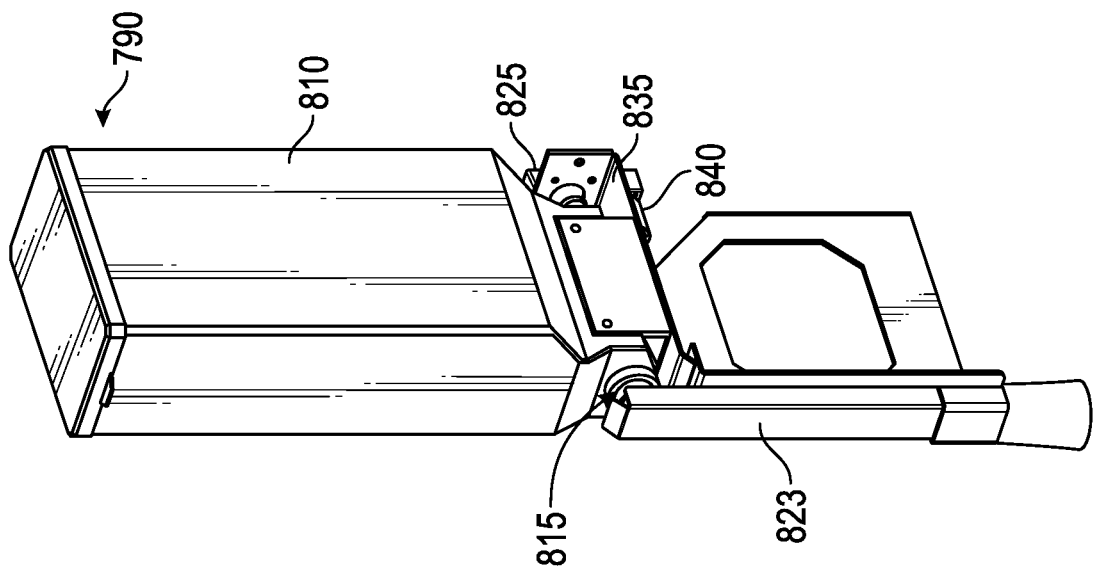
FIG. 26 is a perspective view of a topping dispenser of the topping dispensing station of FIG. 25.
Figure 25:
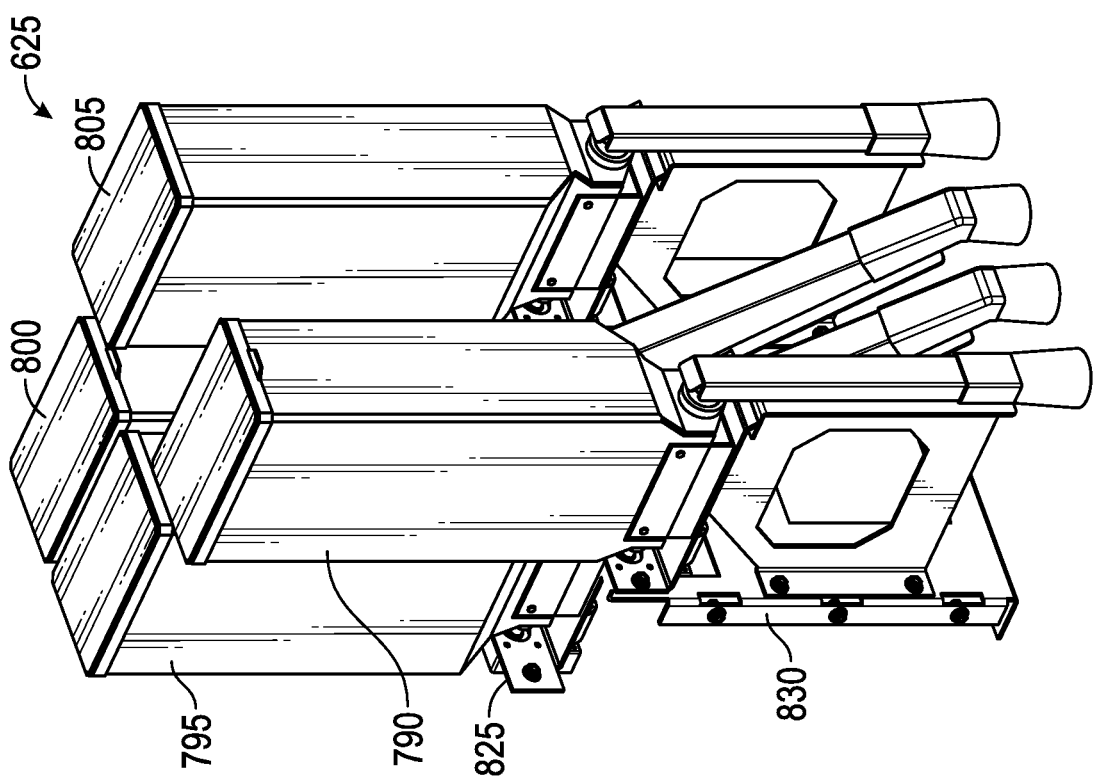
FIG. 25 is a perspective view of a topping dispensing station of the vending machine of FIG. 13.
Figure 27:
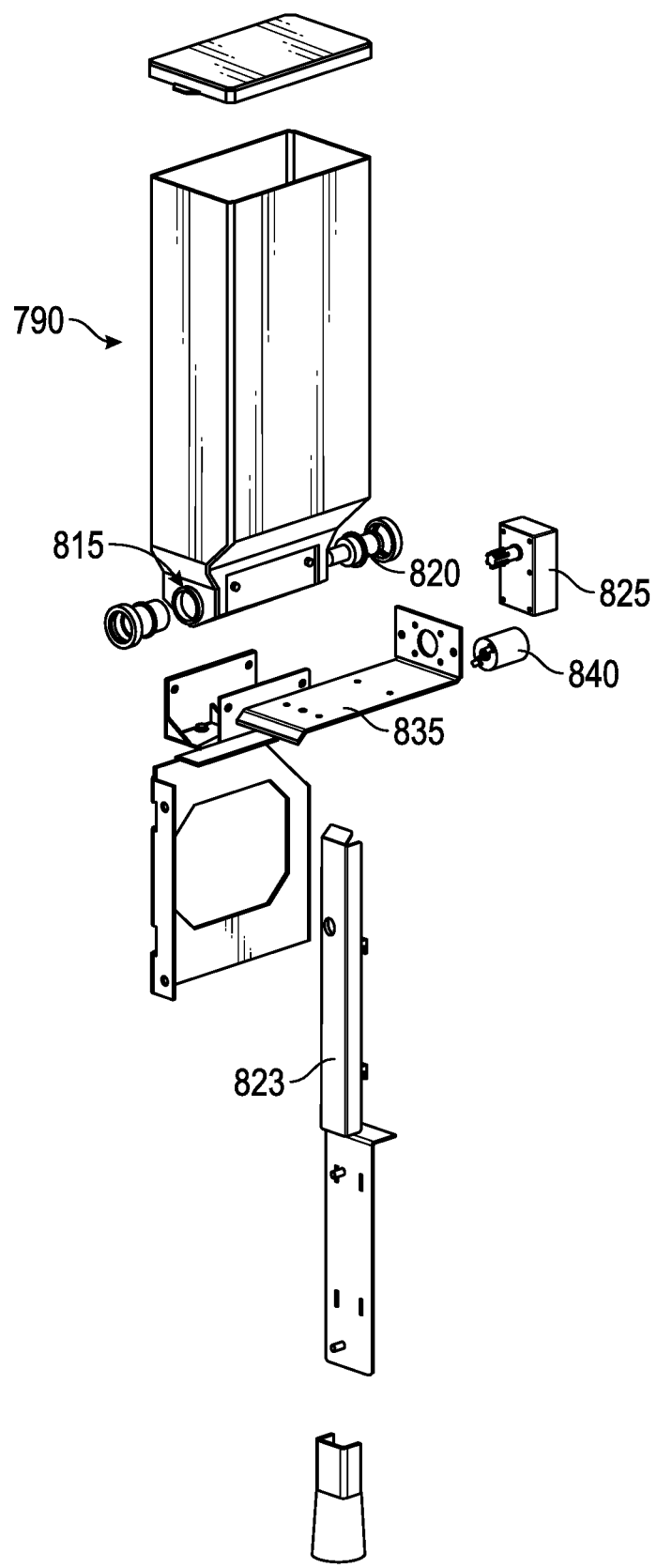
FIG. 27 is an exploded view of the topping dispenser of FIG. 26.

Referring to FIGS. 25-27, topping dispensing station 625 is configured to automatically dispense at least one topping. Toppings may be solid or liquid and may require refrigeration or not. For example, toppings can include various types of candy, sprinkles, fruit, syrups and other toppings appropriate for serving with a frozen food product.

Topping dispensing station 625 includes one or more topping dispensers suitable for dispensing solid toppings. As illustrated, topping dispensing station 625 includes four solid topping dispensers 790, 795, 800, 805. With reference to topping dispenser 790 as shown in FIGS. 26-27, each topping dispenser includes a container 810 for storing a solid topping, a dispense opening 815 through which the topping is dispensed, and an auger 820 for moving the topping from container 810 through dispense opening 815. A guide chute 823 directs the dispensed topping to the dispense position below the topping dispenser. A motor 825 drives auger 820 to dispense the topping. In some embodiments, motor 825 is a stepper motor. Each topping dispenser also includes a base 830 and an arm 835 extending from base 830. Arm 835 supports container 810. Each topping dispenser may also include a weight sensor 840. Weight sensor 840 may be used to monitor the amount of topping dispensed from container 810. In some embodiments, weight sensor 840 includes a strain gauge. As the topping is dispensed, the change in weight of the topping in container 810 causes arm 835 to move relative to base 830 and deforms the strain gauge. The deformation of the strain gauge provides an input which can be used by processing electronics 632 to determine the weight (amount) of topping dispensed from the topping dispenser. Processing electronics 632 may be configured to activate the motor to cause the topping dispenser to dispense topping. Processing electronics 632 may be configured to track the amount (weight) of topping stored in each container 810 to determine if a particular topping is available.

In some embodiments, topping dispensing station 625 is configured to dispense one or more liquid toppings (e.g., chocolate sauce, hot fudge, caramel, butterscotch, etc.) in place of or in addition to solid toppings. Topping dispensers for liquid toppings are known in the art and typically include a vertically movable pump lever that is depressed to dispense the liquid topping. A linear actuator, stepper motor or other appropriate automatic actuator may be used to depress the pump lever or actuate a pump to automate the operation of a liquid topping dispenser. Processing electronics may be configured to determine the amount of liquid topping dispenses based on an input from a flow sensor, an input from a weight sensor (e.g., similar to weight sensor 840), the duration of time the pump is activated, the number of steps of a stepper motor used to activate a pump, etc. In embodiments including one or more toppings that need to be refrigerated, a refrigeration enclosure and a related refrigeration system are included in order to maintain the toppings at the appropriate refrigerated temperature.

Figure 28:
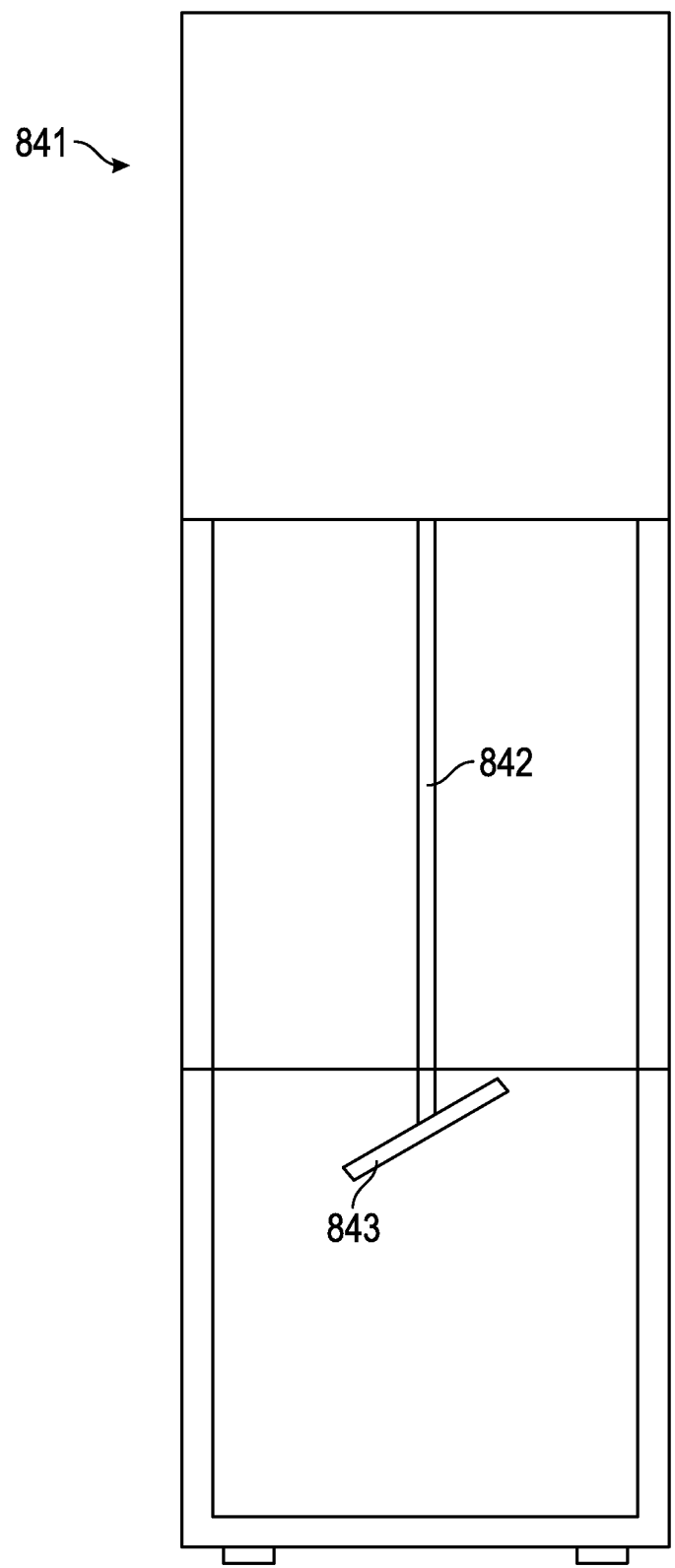
FIG. 28 is a front view of a mix-in blender.
Figure 29:
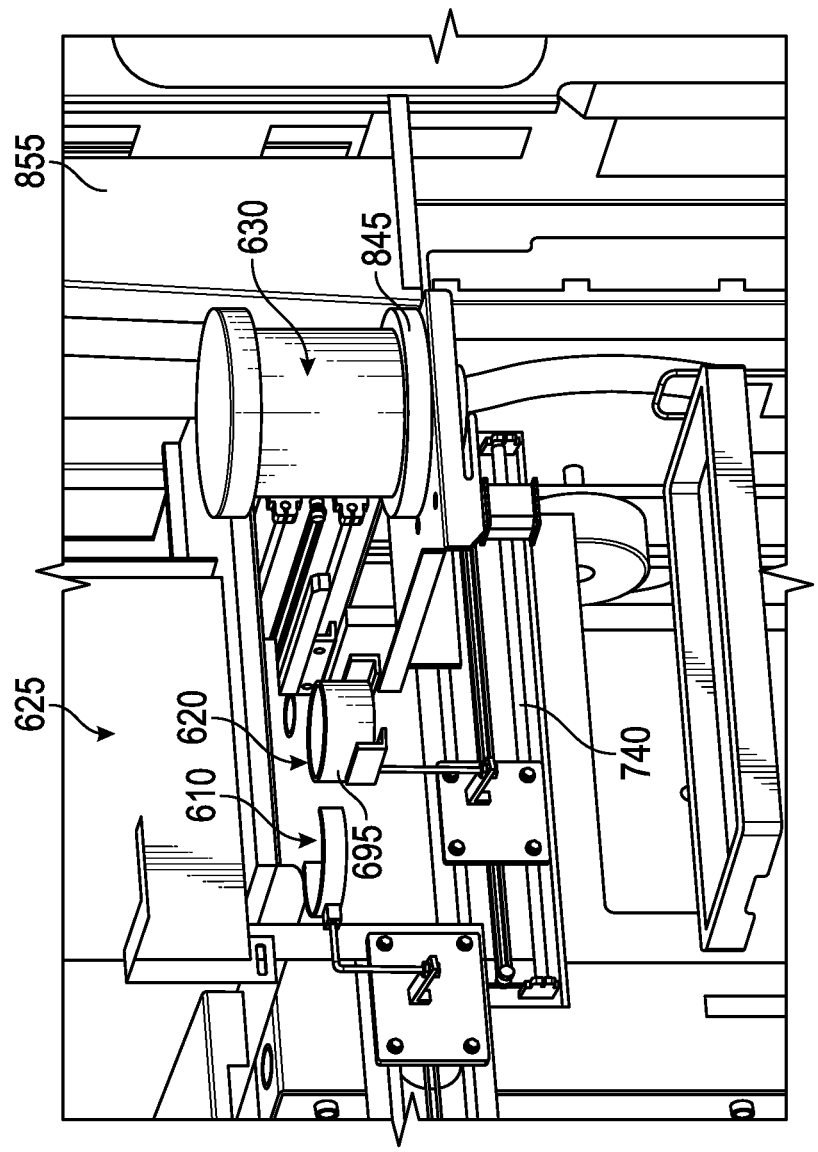
FIG. 29 is a perspective view of a portion of the vending machine of FIG. 13.
Figure 30:
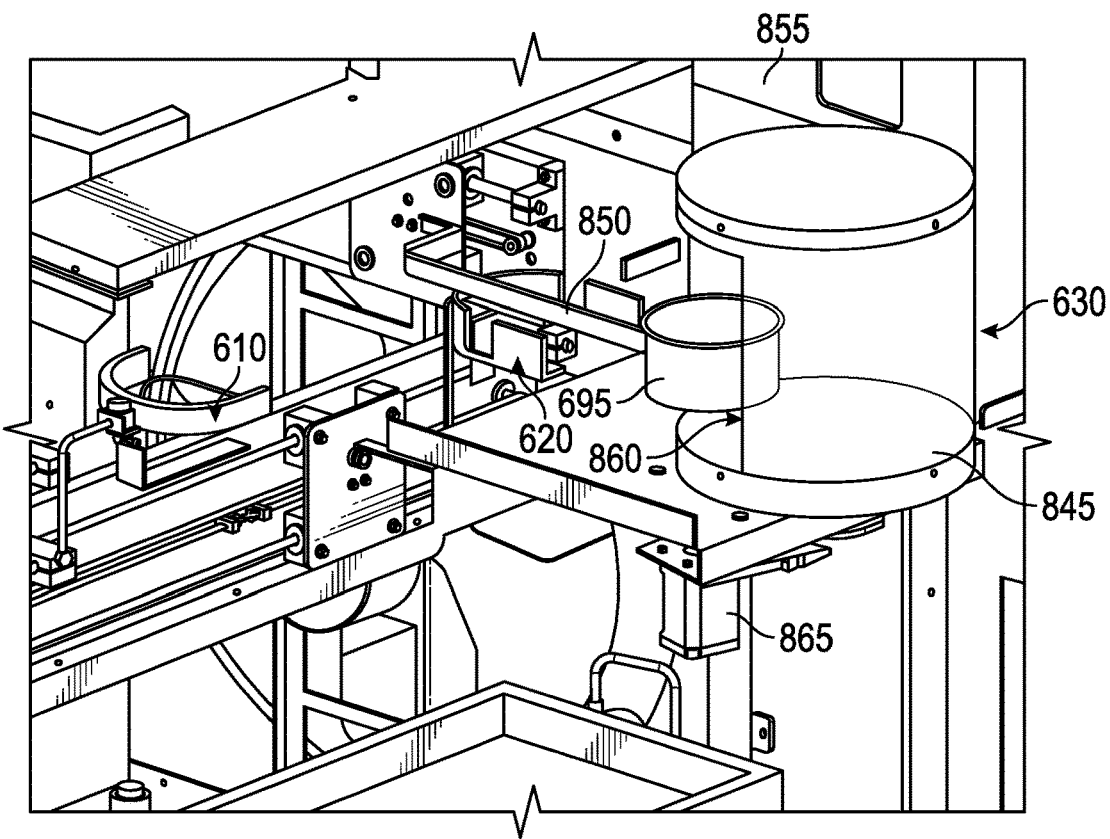
FIG. 30 is a perspective view of a portion of the vending machine of FIG. 13.
Figure 31:
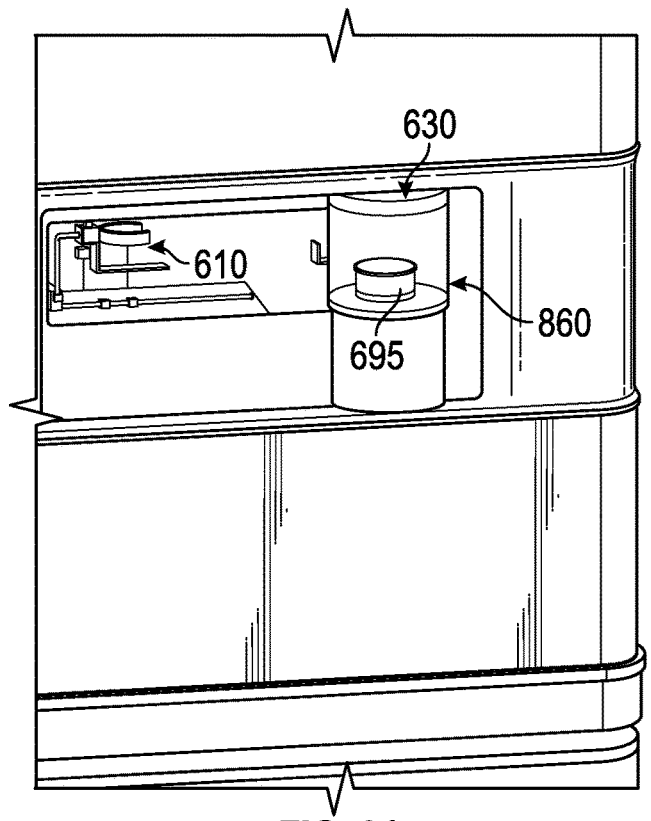
FIG. 31 is a perspective view of a portion of the vending machine of FIG. 13.
Figure 32:
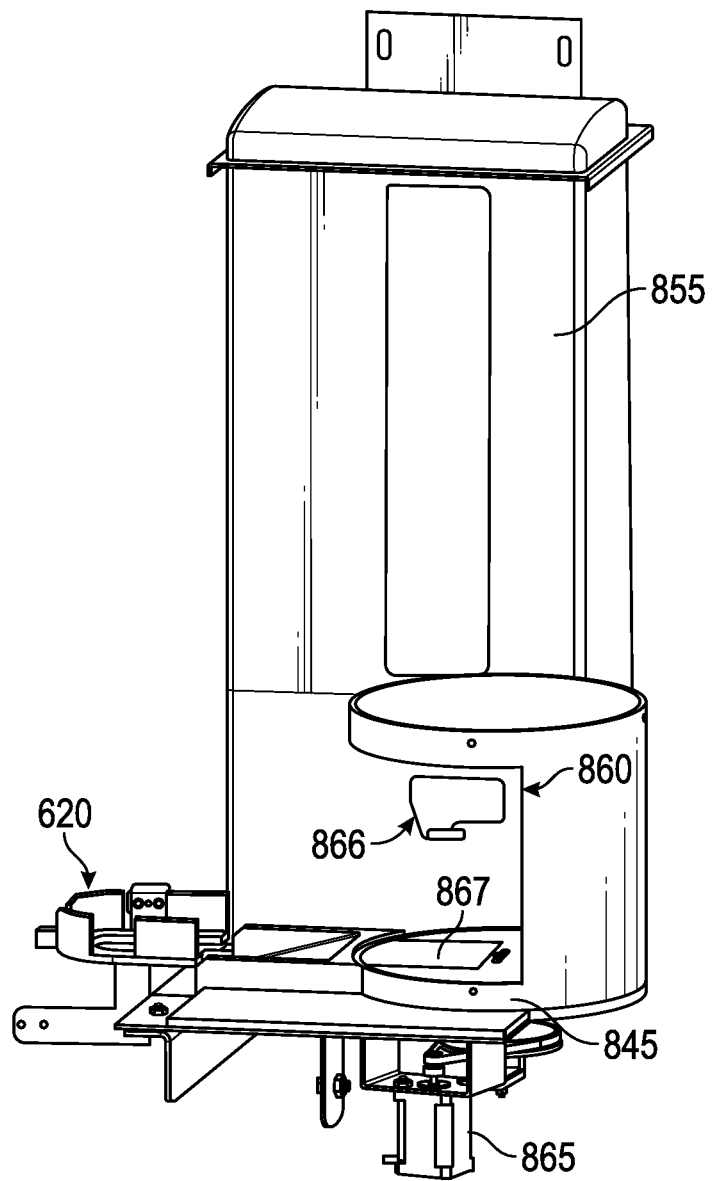
FIG. 32 is a perspective view of a portion of the vending machine of FIG. 13.

Referring to FIG. 28, in some embodiments, topping dispensing station 625 also includes a mix-in blender 841 to blend the dispensed toppings into the dispensed frozen food product. Mix-in blender 841 includes a spindle 842 and blades 843. Spindle 842 and blades 843 rotate to mix or stir a food product. In some embodiments, second movable platform 620 moves dispensed container 695 into a mixing position in which blades 843 are inserted into the dispensed frozen food product and toppings. Mix-in blender 841 is then activated by processing electronics 632 to mix the toppings into the frozen food product. Mix-in blender 841 is then deactivated and second movable platform 620 moves into a disengaged position in which second movable platform 620 and dispensed container 695 are clear to move without contacting mix-in blender. Alternatively, mix-in blender 841 includes a spindle 842 configured to move down and up between an inserted position and a removed position so that blades 843 are moved into and out of the dispensed food product and toppings rather than moving second movable platform 620. A linear actuator, motor (e.g., a stepper motor) is activated by processing electronics 632 to move spindle 842 as needed.

Referring to FIGS. 29-32, user access station 630 is configured to provide a user with access to a dispensed container that has been filled with the selected frozen food product and toppings.

User access station 630 includes a user access platform 845, a pusher arm 850, a utensil dispenser 855, and a user access door 860. User access platform 845 is rotatable and driven by a motor 865 (e.g., a stepper motor) between a transfer position in which dispensed container 695 may be transferred to user access platform 845 and a user access position in which a user may remove dispensed container 695 from user access platform 845 via user access door 860. Pusher arm 850 moves between a retracted position and an extended position to push dispensed container 695 from the second movable platform 620 onto user access platform 845. A linear actuator, motor (e.g., a stepper motor), or other appropriate actuator is used to move pusher arm 850. Utensil dispenser 855 is configured to store and dispense utensils, for example spoon, straws, or other utensils appropriate for consuming a frozen food product. Utensil dispenser 855 is configured to automatically dispense a single utensil at a time to dispense opening 866. Utensil dispenser 855 may be driven by a motor, for example a stepper motor. User access station 630 may also include a presence sensor 867 coupled to user access platform 845 to detect the presence of dispensed container 695. In some embodiments, presence sensor 867 is a weight sensor (e.g., a weight sensor including strain gauge similar to those described above). Processing electronics 632 may be configured to activate utensil dispenser 855 to dispense a single utensil after dispensed container 695 is detected by presence sensor 867. Processing electronics 632 may be configured to rotate user access platform 845 to the user access position after the utensil has been dispensed. After the user access platform 845 has finished moving, a user may reach through user access door 860 to remove dispensed container 695 including the selected frozen food product and toppings and the utensil. An additional presence sensor (e.g., photoelectric sensor, laser sensor, or other appropriate sensor) may be included to detect an unwanted object (e.g., a user's hand or arm, a stuck container, etc.) in the user access door or near the user access platform. Processing electronics 632 may be configured to use an input from the additional presence sensor to stop movement of one or more components of vending machine 600. Alternatively, additional presence sensor may be a hardwired interlock, rather than implemented by programming or computer code, to prevent movement of one or more of the components of vending machine 600.

Referring to FIGS. 13-14, vending machine 600 also includes a user input device 870 which allows user to select various aspects of the frozen food product and toppings to be dispensed. User input device 870 (e.g., a touch screen, a keypad, multiple pushbuttons or switches, etc.) allows a user to make various inputs or selections related to the frozen food product, topping, and container to be dispensed by vending machine 600 and provide these inputs to processing electronics 632. A payment device 875 receives the user's form of payment (e.g., paper money, coins, magnetized credit or debit cards, tokens, tickets, coupons, etc.) for the product to be prepared by vending machine 600. User may select frozen food product to be dispensed (e.g., flavor or type of frozen food product), one or more toppings to be included, and the amount of the desired frozen food product. In other embodiments the size and or type of the container may also be selected by the user. In the illustrated embodiment, user input device 870 is a touchscreen. A display (e.g., the touchscreen) is also provided to present selection options to the user. Processing electronics 632 may be configured to present information related to the types of frozen food product, toppings, and containers available to the user. Processing electronics 632 may be configured to provide information to user indicating if a type of frozen food product, topping, or container is sold out or not available for purchase.

Vending machine 600 also includes a housing 880 having a base 885 and two access doors 890 and 895. The two access doors 890 and 895 are movable relative to base 885 to provide access to the various internal components of vending machine 600. The various panels that make up housing 880, including base 885 and access doors 890 and 895, do not include any externally visible fasteners. All fasteners can be secured internally through the open access doors and any necessary access panels. Not including any externally visible fasteners helps to make vending machine 600 difficult to tamper with or breach, for example in an attempt to steal money from payment device 875.

In some embodiments, user input device 870 and payment device 870 are located remotely from housing 880. For example, in a restaurant or food service station, user input device and payment device could be a cash register operated by an employee. The cash register could communicate with an automated vending machine to make the desired product. This could reduce the number of active employees needed by possibly eliminating an employee previously needed to make the desired product. This could also reduce waste by eliminating human error in the amount of frozen food product and toppings dispensed for a given product because the amounts dispensed are monitored by the automated vending machine.

Vending machine 600 also includes a controller or processing electronics 632. Processing electronics 632 control the operation of the vending machine 600 as described herein. Processing electronics 632 includes a processor 900 and memory 905. In some embodiments, processing electronics 632 may include features of processing electronics 240 described above.

Figure 33:
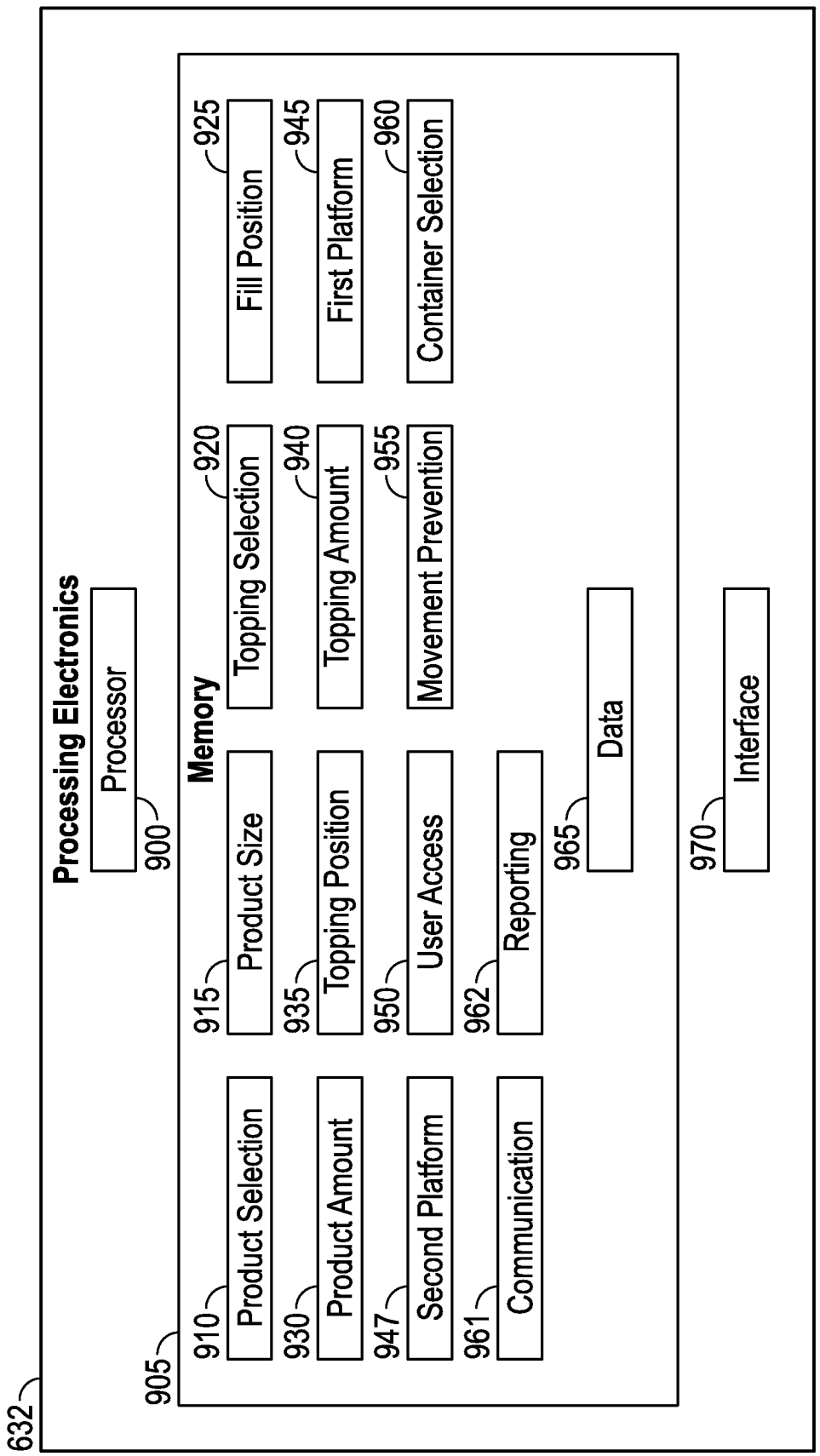
FIG. 33 is a block diagram of processing electronics configured to control the vending machine of FIG. 13.
Figure 34:
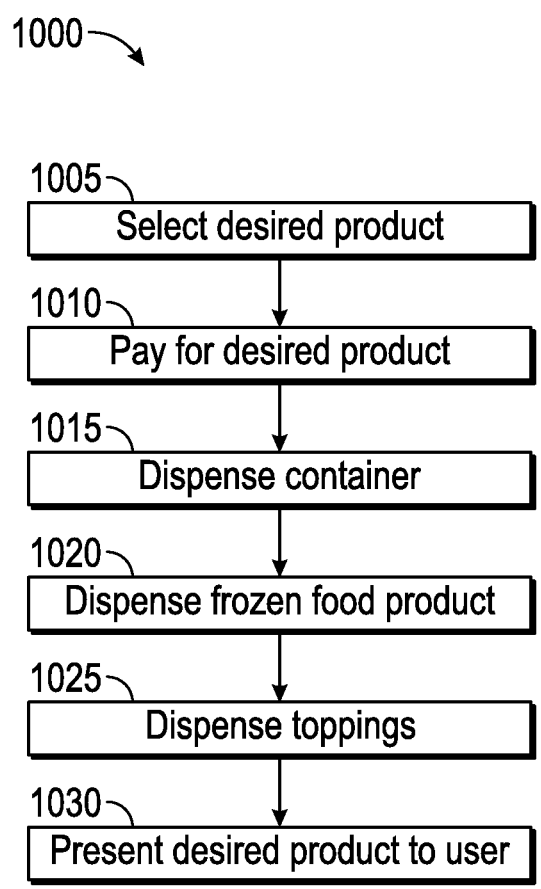
FIG. 34 is a flow chart of a method of operating an automatic frozen food product vending machine according to an exemplary embodiment.

Referring to FIG. 33, a block diagram of the processing electronics or circuit is shown, according to an exemplary embodiment. Processor 900 may be or include one or more microprocessors (e.g., CPUs, GPUs, etc.), an application specific integrated circuit (ASIC), a circuit containing one or more processing components, a group of distributed processing components (e.g., processing components in communication via a data network or bus), circuitry for supporting a microprocessor, or other hardware configured for processing data. Processor 900 is also configured to execute computer code stored in memory to complete and facilitate the activities described herein. Memory 905 can be any volatile or non-volatile computer-readable storage medium, or combinations of storage media, capable of storing data or computer code relating to the activities described herein. For example, memory 905 is shown to include computer code modules such as a frozen food product selection module 910, a frozen food product size selection module 915, a topping selection module 920, a fill position determination module 925, a product amount determination module 930, a topping position determination module 935, a topping amount determination module 940, a first movable platform position module 945, a second movable platform position module 947, a user access station module 950, a movement prevention module 955, a container selection module 960, a communication module 961, and a reporting module 962. In some embodiments, more or fewer modules are included. Memory 905 may also include various types of data 965 including desired product data, position, presence, and quantity data, etc. to be used in determinations made by processing electronics 632. When executed by processor 900, processing electronics 632 is configured to complete the activities described herein.

Processing electronics 632 also includes a hardware interface 970 configured to receive data (e.g., electrical signals) as input(s) to processing electronics 632 and provide data (e.g., electrical signals) as output(s) from processing electronics 632. Hardware interface 970 may be configured to receive data as input(s) to processing electronics 632 (e.g. from user input device 870, payment device 875, various sensors, motors, and actuators described above and/or communicate data as output(s) to another computing device or other components of the vending machine (e.g., user interface device, display, motors, linear actuators, etc. to implement the operation of the vending machine as described herein). Hardware interface 970 may include circuitry to communicate data via any number of types of networks or other data communication channels. For example, hardware interface 970 may include circuitry to receive and transmit data via a wireless network or via a wired connection. In another example, hardware interface 970 may include circuitry configured to receive or transmit data via a communications bus with other electronic devices. Hardware interface 970 may include an antenna, data port, or other appropriate connection for connecting processing electronics 632 to other components of vending machine or external devices.

Memory 905 may include frozen food product selection module 910. Product selection module 910 may be configured to identify the frozen food product selected by a user via user input device 870. Such a selection can be made based on the flavor of the desired frozen product dispensed by the spigots (e.g., vanilla, chocolate, and twist) or based on the location of the spigot (e.g., left, right, and center) that dispenses the desired flavor of frozen food product. Product selection module 910 may be further configured to determine if sufficient funds have been deposited via payment device 875 to pay for the selected frozen food product.

Memory 905 may include frozen food product size selection module 915. Product size selection module 915 may be configured to identify the amount (e.g., volume) of selected frozen food product to be dispensed as selected by a user via user input device 870. Such a selection may be based on a relative size (e.g., small, medium, large, extra-large, etc.), based on a volumetric measurement, based on a weight, etc. Product size selection module 915 may be further configured to determine if sufficient funds have been deposited via payment device 875 to pay for the selected amount frozen food product.

Memory 905 may include topping selection module 920. Topping selection module 920 may be configured to identify one or more toppings selected by a user via user input device 870. Such a selection can be made based on the type or flavor of the desired toppings dispensed by the topping dispenser (e.g., sprinkles, chocolate chips, various types of candy pieces, various types of nuts, various types of liquid sauces, various types of fruit toppings, etc.) or based on the location of the topping dispenser (e.g., first, second, third, fourth, etc. from left-to-right) that dispenses the desired topping. Topping selection module 920 may also be configured to identify an amount of the selected topping to be dispensed. Such an identification may be based on a relative size (e.g., small, medium, large, extra-large, etc.), based on a volumetric measurement, based on a weight, etc. Topping selection module 920 may be further configured to determine if sufficient funds have been deposited via payment device 875 to pay for the selected topping(s).

Memory 905 may include fill position determination module 925. Fill position determination module 925 may be configured to determine to which of the fill positions (i.e., one under each spigot 725, 730, and 735) first movable platform 610 will move to in order to receive the selected frozen food product. This determination may be made in response to inputs from the product selection module 910 and product size selection module 915.

Memory 905 may include product amount determination module 930. Product amount determination module 930 may be configured to determine how much of the selected frozen product will be dispensed and/or how much of the selected frozen food product has been dispensed. The amount to be dispensed may be determined in response to inputs from the product size selection module 915. The amount that has been dispensed may be determined by the amount of time the dispensing spigot or valve has been opened, an input indicative of the change in weight detected by the weight sensor of first movable platform 610, a combination of the two, or other appropriate method (e.g., an input from a flow sensor).

Memory 905 may include topping position determination module 935. Topping position determination module 935 may be configured to determine which of the topping dispenser positions (i.e., one under each topping dispenser 790, 795, 800, 805), second movable platform 620 will move to receive the selected topping(s). This determination may be made in response to inputs from the topping selection module 920.

Memory 905 may include topping amount determination module 940. Topping amount determination module 940 may be configured to determine how much of the selected topping will be dispensed and/or how much of the selected topping has been dispensed. The amount to be dispensed may be determined in response to inputs from the topping selection module 920. The amount to be dispensed may vary based on the selected amount of frozen food product and/or the size of the selected container. The amount that has been dispensed may be determined by the amount of time the selected topping dispenser is operated (e.g., the amount of time the motor is driving the dispensing auger), an input indicative of the change in weight detected by the weight sensor of the topping dispenser, an input indicative of the change in weight detected by a weight sensor of the second movable platform, or combinations thereof.

Memory 905 may include first movable platform position module 945. First movable platform position module 945 is configured to determine and track the position of first movable platform 610 across the range of motion of first movable platform 610 (e.g., based on position of linear actuators, based on step count of stepper motor or motors used to move first movable platform 610, based on operating time of linear actuators, based on operating time of stepper motors or motors, etc.). First movable platform position module 945 may identify various intended positions of first movable platform 610 (e.g., container dispense position, selected frozen food product dispense position, transfer position with second movable platform 620, etc.) relative to a home position or relative to one another. For example, first movable platform position module 945 may include data indicating the number of steps needed by the first stepper motor and the second stepper motor of the first gantry 665 and/or the amount of operating time need by the first stepper motor and the second stepper motor of the first gantry 665 to move first movable platform 610 from the container dispense position under container dispenser 605 to the frozen food product dispense position under first spigot 725. First movable platform position module 945 may also be configured to provide outputs to first movable platform 610 to cause the first movable platform to move (e.g., to activate linear actuators or stepper motors).

Memory 905 may include second movable platform position module 947. Second movable platform position module 947 is configured to determine and track the position of second movable platform 620 across the range of motion of second movable platform 620 (e.g., based on position of linear actuators, based on step count of stepper motor or motors used to move second movable platform 620, based on operating time of linear actuators, based on operating time of stepper motors or motors, etc.). Second movable platform position module 947 may identify various intended positions of second movable platform 620 (e.g., transfer position with respect to first movable platform 610, selected topping dispense position, transfer position with respect to user access station 630, etc.) relative to a home position or relative to one another. For example, second movable platform position module 947 may include data indicating the number of steps needed by the first stepper motor and the second stepper motor of the second gantry 740 and/or the amount of operating time need by the first stepper motor and the second stepper motor of the second gantry 740 to move second movable platform 620 from the transfer position with respect to first movable platform 610 to the topping dispense position under the first topping dispenser 790. Second movable platform position module 947 may also be configured to provide outputs to second movable platform 620 to cause second movable platform 620 to move (e.g., to activate linear actuators or stepper motors).

Memory 905 may include user access station module 950. User access station module 950 may be configured to actuate pusher arm 850 to transfer a container from second movable platform 620 to user access platform 845. User access station module 950 may be configured to detect the presence of a container on user access platform 845 via an input from a weight sensor or a presence sensor (e.g., sensor 867). User access station module 950 may be configured to provide an output to utensil dispenser 855 to dispense a utensil in response to detecting a container on the user access platform 845. User access station module 950 may be configured to provide an output to rotate user access platform 845.

Memory 905 may include movement prevention module 955. Movement prevention module 955 may be configured to prevent movement of user access platform, utensil dispenser, pusher arm, second movable platform, topping dispensing station, first movable platform, dispensing station, container dispenser and other automated moving components of the vending machine when an unwanted object is detected in the user access door, near the user access platform, or when one of the housing doors is opened. A presence sensor (e.g., photoelectric sensor, laser sensor, or other appropriate sensor) may be used to provide an input to movement prevention module 955 of an unwanted object (e.g., a user's hand or arm, a stuck container, etc.) in the user access door or near the user access platform. A limit switch, magnetic switch, or other appropriate switch may be used to provide an input to movement prevention module that one of the housing access doors has been opened. Alternatively or additionally, movement prevention module 955 may be a hard-wired interlock, rather than a computer code module, configured to prevent movement of one or more of the automated moving components of the vending machine.

Memory 905 may include container selection module 960. Container selection module 960 may be configured to identify the frozen food product container selected by a user via user input device 870. Such a selection can be made based on the type of the desired container (cone, cup, bowl, etc.) or based on the location of the desired container sleeve that dispenses the desired container. Selections may also include the size of the desired container based on a relative size (e.g., small, medium, large, extra-large, etc.), based on a volumetric measurement, etc. Container selection module 960 may be further configured to determine if sufficient funds have been deposited via payment device 875 to pay for the selected container and size of container.

Memory 905 may also include a communication module 961. Communication module 961 may be configured to provide for communication between systems and devices both internal and external to vending machine 600. For example, the communication module may be configured to use an antenna or data port for communication over a network. For example, the communication module may be used to communicate data related to vending machine 600 over a wireless network (e.g., Wi-Fi or cellular) or over the internet.

Memory 905 may also include a reporting module 962. Reporting module 962 may be configured to gather or compile various data related to the status, performance, operation, sales, etc. of vending machine and package that data into a report. Reporting module 962 may be configured to provide communication module 961 with the necessary inputs to transfer a report over a wireless network or the internet to a user (e.g., the owner of vending machine, the person or company responsible for stocking vending machine, etc.).

Reporting module 962 may gather or compile vending machine information. Vending machine information may include a store number or unique identifier used to identify a particular vending machine, location information about the specific location of a particular vending machine including location type, location address, and location description, region information about the specific region a particular vending machine is located in (e.g., a particular sales region, a particular state or other geographic region, etc.), franchisee/licensee information about a particular franchisee or licensee using or responsible for a particular vending machine, and product information including number of types of frozen food product, toppings, and containers that can be dispensed by a particular vending machine.

Reporting module 962 may gather or compile sales information. Sales information may include quantity or currency value of sales by type of frozen food product, flavor of frozen food product, size of frozen food product, type of topping, flavor of topping, size of topping, type of payment (e.g., cash, debit, credit, vouchers etc.). Sales information may be presented as gross or net sales. Sales information may also include quantity or currency value of discounts and refunds. Sales information may also include cancellation information including quantity of cancellations and location of the cancellation during the ordering process. Sales information may also include invoice information, including quantity of invoices and average invoices.

Reporting module 962 may gather or compile usage information. Usage information may include quantity (e.g., servings, volume, etc.) of type of frozen food product dispensed, flavor of frozen food product dispensed, type of container dispensed, size of container dispensed, type of topping dispensed, flavor of topping dispensed. Usage information may also include quantity (e.g., servings, volume, etc.) of type of frozen food product available, flavor of frozen food product available, type of container available, size of container available, type of topping available, flavor of topping available. Reporting module 962 may gather or compile operation information. Operation information may include time a particular vending machine is in use (awake), not in use (asleep or standby), or out of service (e.g., out of stock, not operational due to an error or damage, etc.), number and frequency of service calls and dates of such service calls (e.g., to stock vending machine, to repair vending machine, etc.), current status of a particular vending machine (e.g., awake, asleep, out of service, etc.), and error information including type of error, time and date error occurred, time and date error was resolved, etc.

Reporting module 962 may generate reports including relevant information (e.g., vending machine information, sales information, usage information, etc.). Reports may include reports for a single machine and reports for a group of machines (e.g., from a particular location, from a particular type of location, from a particular region, for a particular franchisee or licensee, etc.). Reports may provide relevant information for a particular date range. The date range may be customizable and specified by a user, or may be set for a particular time period (e.g., daily, weekly, monthly, quarterly, yearly, etc.). Reports may present aggregate or to-date data or may present trends across particular time periods (e.g., daily, weekly, monthly, quarterly, yearly, etc.).

Reporting module 962 may also be configured to monitor the status of vending machine 600. Monitoring may include detecting errors in operation of vending machine, detecting out-of-stock errors in vending machine, etc. Reporting module 962 may detect errors in the operation of vending 600 by comparing expected operation versus actual operation of the various components of vending machine 600. For example, if frozen food product dispensing station 615 indicates that frozen food product is being dispensed, but weight sensor 720 of first movable platform 610 is not detecting a change in weight indicative of frozen food product reaching dispensed container 695, this may indicate that frozen food product dispensing station 615 is out of product, that first movable platform 610 has not reached the proper dispense position, or some other error in operation of vending machine 600. The various actuators and motors of vending machine 600 may also experience operational error states. For example, a motor drawing an unexpectedly large current may indicate a jam or other obstruction that is preventing the motor from moving a component as intended (e.g., first gantry 665 could be bound up or otherwise jammed, preventing motors from moving gantry 665 as intended). The various sensors of vending machine 600 may also indicate out-of-stock error states. For example, an out of containers error may be generated when container presence 653 indicates no containers present in any of container sleeves 650. Reporting module 962 may be configured to track operation time of each freezer barrel of frozen food product dispensing station 615 to determine when a freezer barrel is out of stock or to track total weight of frozen food product dispensed from each freezer barrel with weight sensor 720 to determine when a freezer barrel is out of stock. Reporting module 962 may be configured to detect when a topping dispenser is out of stock based on an input from the weight sensor associated a particular topping dispenser.

Reporting module 962 may be configured to provide error monitoring reports to indicate errors in real time, or batched error reports at particular times (e.g., morning, noon, end of business day, etc.). Such error reports can be routed to a service provider who is tasked with fixing operation errors and/or restocking vending machine 600. In this way, the service provider can tend to vending machine 600 on an as-needed basis.

Data 965 may include desired product data. In general, desired product data may include end user-provided data to indicate the desired product to be produced by the vending machine (e.g., a sundae). End user-provided data may include, but is not limited to, data regarding the desired frozen food product, the desired amount of frozen food product, the desired topping or toppings, the desired type of container selected by the user, and the desired container size selected by the user (e.g., via user input device 870), payment for the desired product as selected by the user (e.g., via payment device 875). Desired product data may also include vendor data indicating what products the vendor has stocked in the vending machine. Vendor data may include, but is not limited to, type(s) of frozen food product provided in the frozen food product dispensing station, which spigot provides which type of frozen food product, the type(s) of topping provided in the topping dispensing station, which topping dispenser provides which type of topping, the type (s) of utensil provided in the utensil dispenser, the size(s) and type(s) of container provided in the container dispenser, and which size and type of container is provided in which container storage location (e.g., container support sleeve).

Data 965 may include position, presence, and quantity data. Position data may track and store data related to the position of the various automated moving components of the vending machine. Presence data may track and store data related to the presence of a dispensed container in the vending machine (e.g., which platform(s) currently contain a dispensed container). Quantity data may track and store date related to the quantities of perishable goods stored in the vending machine (e.g., number of containers, amount of frozen food product, amount of toppings, number of utensils). In some embodiments, the various components storing perishable goods are sized to provide a common number of servings before needing to be refilled. For example, the maximum amount of containers, frozen food product, toppings, and utensils may enable vending machine 600 to produce a predetermined number of servings (e.g., 100, 150, 200, etc.) before vending machine 600 needs to be refilled.

In operation, processing electronics 632 may be configured or programmed to operate vending machine according to various embodiments of the methods of operation described herein.

Referring to FIG. 33, a method of operating an automatic of automated frozen food product vending machine 1000 is described according to an exemplary embodiment. A user selects (step 1005) and pays for a desired product (step 1010) (e.g., a sundae, a cone, a dish of frozen food product, a shake, a frozen beverage, etc.) (e.g., via user input device and payment device). The user may make the selections and then be informed of the necessary payment or can make the payment and then make the necessary selections in view of the amount of payment made. Desired product selections may include desired type and/or size of container, desired type of frozen food product, desired amount of frozen food product, desired toppings, and desired amount of toppings. After the user has made and/or confirmed the desired product selections, the vending machine automatically dispenses the selected frozen food product and toppings into the selected frozen food product container and presents the finished product with a utensil to the user without any further interaction with the user.

After the user's selection and payment have been entered, the selected container is dispensed (step 1015). In some embodiments, the first movable platform moves to a position below the container dispenser in which the arm of the first movable platform is aligned with the dispense opening of the container dispenser. The dispense mechanism automatically dispenses a single cup onto the arm of the first movable platform. As the first movable platform moves upward towards the container dispenser, a finger or post contacts the movable arm of the first movable platform moving the arm into the open position so that the first movable platform may receive the container to be dispensed. After the container has been dispensed onto the first movable platform, the movable platform moves downward bringing the finger out of contact with the movable arm and allowing the arm to move to the closed position, thereby securing the dispense container onto the first movable platform.

After the selected container has been dispensed, it is filled with the selected amount of the selected frozen food product (step 1020). In some embodiments, the movable platform moves to a selected dispense position to receive the frozen food product selected by the user. At this position the selected amount of frozen food product is dispensed. The amount of frozen food product dispensed can be monitored by the time of dispensing, the weight of dispensed frozen food product detected by the weight sensor of the first movable platform, a flow of dispensed frozen food product as detected by a flow sensor, or combinations thereof.

After the frozen food product has been dispensed, any selected toppings are added to the container (step 1025). In some embodiments, the second movable platform moves to a transfer position and the first movable platform, now supporting the container including the dispensed frozen food product, moves to a related transfer position where the container is able to be transferred from the first movable platform to the second movable platform. The arm of the first movable platform passes through the associated cut-out in the second movable platform so that the dispensed frozen food product container is aligned with the support base of the second movable platform. The first movable platform is then withdrawn with the wall of the second movable platform preventing the dispensed container from moving with the first movable platform, thereby transferring the dispensed frozen food product container to the second movable platform. The movable arm of the first frozen food product container contacts the container itself of a finger of post and is moved to the open position as the first movable platform moves away from the second movable platform. The second movable platform then moves to a position beneath the topping dispensing station. The position is associated with the selected topping or toppings to be dispensed. At each of the selected topping positions, the topping dispenser for the associated position dispenses the selected amount of topping. For example, the motor is used to actuate the auger thereby dispensing topping through the dispense opening of the topping dispenser with the topping falling into the container and/or onto the dispensed frozen food product. The amount of dispensed topping may be monitored by the weight sensor associated with the topping dispenser.

After receiving all of the selected toppings, the container including the dispensed frozen food product and toppings is presented to the user for consumption (step 1030). In some embodiments, the second movable platform moves to a position adjacent the user access platform. The pusher arm moves from the retracted position to the extended position, passing through the associated cut-out of the wall of the second movable platform, thereby moving the now-finished product to the user access platform. The pusher arm contacts the container to move the finished product from the second movable platform to the user access platform. The weight sensor of the user access platform determines the presence of the finished product and confirms that it has been successfully transferred by the pusher arm. The utensil dispenser dispenses a single utensil. The user access platform rotates to the user access position in which the user may access the completed product and utensil through the user access door. Before the user access platform is rotated to this user access position, the user cannot reach through the user access door into the interior of the vending machine.

The construction and arrangement of the apparatus, systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, some elements shown as integrally formed may be constructed from multiple parts or elements, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show or the description may provide a specific order of method steps, the order of the steps may differ from what is depicted. Also two or more steps may be performed concurrently or with partial concurrence. Such variation will depend on various factors, including software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An automatic frozen food product vending machine, comprising:
   a freezer barrel configured to produce a frozen food product;
   a spigot fluidly connected to the freezer barrel, the spigot for dispensing the frozen food product;
   a movable platform for supporting a container to receive frozen food product, the movable container movable among a home position and a fill position below the spigot; and
   a processing circuit configured to:
      open the spigot and fill the container with an amount of frozen food product; and move the movable platform downward from the fill position toward the home position while filling the container with the amount of the frozen food product.

2. The automatic frozen food product vending machine of claim 1, further comprising a stepper motor configured to move the movable platform.

3. The automatic frozen food product vending machine of claim 2, wherein the processing circuit is further configured to move the movable platform from the home position to the fill position based on accumulated steps of the stepper motor.

4. The automatic frozen food product vending machine of claim 3, further comprising a payment acceptor for receiving a form of payment for the frozen food product to be prepared by the vending machine.

5. The automatic frozen food product vending machine of claim 4, wherein the payment acceptor is configured to receive a vending machine specific tender.

6. The automatic frozen food product vending machine of claim 5, wherein the payment acceptor is configured to receive a token.

7. The automatic frozen food product vending machine of claim 4, wherein the payment acceptor is configured to receive paper money and coins.

8. The automatic frozen food product vending machine of claim 4, wherein the payment acceptor is configured to receive magnetized credit or debit cards.

9. The automatic frozen food product vending machine of claim 1, further comprising a payment acceptor for receiving a form of payment for the frozen food product to be prepared by the vending machine.

10. The automatic frozen food product vending machine of claim 9, wherein the payment acceptor is configured to receive a vending machine specific tender.

11. The automatic frozen food product vending machine of claim 10, wherein the payment acceptor is configured to receive a tokens.

12. The automatic frozen food product vending machine of claim 9, wherein the payment acceptor is configured to receive paper money and coins.

13. The automatic frozen food product vending machine of claim 9, wherein the payment acceptor is configured to receive magnetized credit or debit cards.

* * * * *